(12) United States Patent
Kurihara et al.

(10) Patent No.: US 11,437,035 B2
(45) Date of Patent: Sep. 6, 2022

(54) AGENT DEVICE, METHOD FOR CONTROLLING AGENT DEVICE, AND STORAGE MEDIUM

(71) Applicant: HONDA MOTOR CO., LTD., Tokyo (JP)

(72) Inventors: Masaki Kurihara, Wako (JP); Hiroshi Honda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 16/813,815

(22) Filed: Mar. 10, 2020

(65) Prior Publication Data
US 2020/0294502 A1 Sep. 17, 2020

(30) Foreign Application Priority Data
Mar. 13, 2019 (JP) .............................. JP2019-045691

(51) Int. Cl.
*G10L 15/22* (2006.01)
*G10L 15/30* (2013.01)
*G06F 16/9537* (2019.01)
*B60R 16/037* (2006.01)
*G01C 21/36* (2006.01)

(52) U.S. Cl.
CPC .......... *G10L 15/22* (2013.01); *G06F 16/9537* (2019.01); *G10L 15/30* (2013.01); *B60R 16/0373* (2013.01); *G01C 21/3608* (2013.01); *G01C 21/3629* (2013.01); *G10L 2015/223* (2013.01)

(58) Field of Classification Search
USPC ................ 704/231, 246, 247, 251, 252, 275
See application file for complete search history.

(56) References Cited

U.S. PATENT DOCUMENTS

| | | | |
|---|---|---|---|
| 2018/0204569 A1* | 7/2018 | Nadkar | G10L 15/22 |
| 2019/0239041 A1* | 8/2019 | Kume | B60W 40/09 |
| 2019/0251973 A1* | 8/2019 | Kume | G06F 3/165 |
| 2019/0259275 A1* | 8/2019 | Kubo | G07C 5/008 |
| 2019/0283776 A1* | 9/2019 | Lubcke | G06T 19/006 |

FOREIGN PATENT DOCUMENTS

JP 2006-335231 12/2006

* cited by examiner

*Primary Examiner* — Leonard Saint Cyr
(74) *Attorney, Agent, or Firm* — Amin, Turocy & Watson, LLP

(57) ABSTRACT

An agent device is equipped with a plurality of agent controllers which provide a service including causing an output device to output a response of voice in accordance with an utterance of an occupant of a vehicle, in which a first agent controller included in the plurality of agent controllers provides an agent controller different from the first agent controller with first service information on the service to be provided to the occupant.

15 Claims, 17 Drawing Sheets

| | KIND OF KNOWLEDGE<br>AGENT NAME | GEOGRAPHY | MUSIC | CURRENT AFFAIRS | ... |
|---|---|---|---|---|---|
| AGENT 1 | | ◎ | ○ | △ | ... |
| AGENT 2 | | △ | ◎ | ○ | ... |
| AGENT 3 | | ○ | △ | ◎ | ... |
| ⋮ | | ⋮ | ⋮ | ⋮ | ⋮ |

AGENT DEVICE, METHOD FOR CONTROLLING AGENT DEVICE, AND STORAGE MEDIUM

CROSS-REFERENCE TO RELATED APPLICATION

Priority is claimed on Japanese Patent Application No. 2019-045691, filed Mar. 13, 2019, the content of which is incorporated herein by reference.

BACKGROUND

Field

The present invention relates to an agent device, a method for controlling the agent device, and a storage medium.

Description of Related Art

In the related art, a technology related to an agent function for providing information on driving support according to a request of an occupant, control of a vehicle, other applications, and the like, while having a conversation with the occupant of the vehicle has been disclosed (Japanese Unexamined Patent Application, First Publication No. 2006-335231).

In recent years, although practical applications in which an agent function is mounted in vehicles has been promoted, the provision of services in the agent function has not been sufficiently studied. For this reason, in the related art, there are cases in which a degree of satisfaction of a user has been low in regard to the provision of services of the agent function.

SUMMARY

An object of the invention is to provide an agent device, a method for controlling the agent device, and a storage medium capable of improving the degree of satisfaction of a user.

The agent device, the method for controlling the agent device, and the storage medium according to the present invention adopt the following configurations.

(1): An agent device according to an aspect of the present invention is equipped with a plurality of agent controllers which provide a service including causing an output device to output a response of voice in accordance with an utterance of an occupant of a vehicle, in which a first agent controller included in the plurality of agent controllers provides an agent controller different from the first agent controller with first service information on the service to be provided to the occupant.

(2): In the aforementioned aspect (1), a second agent controller included in the plurality of agent controllers may be able to provide the occupant with second service information on the first service information in accordance with the first service information provided by the first agent controller.

(3): In the aforementioned aspect (1) or (2), a second agent controller included in the plurality of agent controllers may provide the occupant with second service information in which a degree of association with the first service information is equal to or greater than a predetermined degree, in accordance with the first service information provided by the first agent controller, and the second agent controller may not provide the occupant with third service information in which the degree of association with the first service information is less than the predetermined degree, in accordance with the first service information provided by the first agent controller.

(4): In the aforementioned aspect of (2) or (3), the second agent controller may voluntarily provide the occupant with the second service information, without depending on an instruction of the occupant.

(5): In any one of the aforementioned aspects (2) to (4), the first service information may be a search result on a search of a destination performed by the occupant of the vehicle.

(6): In the aforementioned aspect (5), the second service information may be one or more information of a recommended place, music, a route to the destination or knowledge information on the destination.

(7): In any one of the aforementioned aspects (2) to (6), a third agent controller included in the plurality of agent controllers may be able to provide the occupant with fourth service information on the first service information, in accordance with the first service information provided by the first agent controller, and when a similarity between the fourth service information and the second service information is equal to or greater than a predetermined degree, the third agent controller may not provide the occupant with the fourth service information.

(8): In the aforementioned aspect (7), when the similarity between the fourth service information and the second service information is less than the predetermined degree, the third agent controller may provide the occupant with the fourth service information.

(9): In any one of the aforementioned aspects (1) to (8), the first agent controller included in the plurality of agent controllers may preferentially provide first service information on the service to be provided to the occupant, to an agent controller which is good at providing information on the first service information, among the one or more agent controllers different from the first agent controller.

(10): In the aforementioned aspect (1), the agent device further includes an adjuster which provides an agent controller different from the first agent controller with information on a first service related to a service to be provided to the occupant by the first agent controller.

(11): In the aforementioned aspect (10), the adjuster may provide two or more agent controllers different from the first agent controller with information on the first service, and when each of the two or more agent controllers proposes to provide the occupant with second service information on the first service information in accordance with first service information, the adjuster may provide the occupant with at least one of the plurality of second service information.

(12): According to an aspect of the present invention, there is provided a method for controlling an agent device, in which a computer causes a plurality of agent controllers to provide a service including causing an output device to output a response of voice in accordance with an utterance of an occupant of a vehicle, and the computer causes a first agent controller included in the plurality of agent controllers to provide an agent controller different from the first agent controller with first service information on the service to be provided to the occupant.

(13): A non-transitory computer-readable storage medium that stores a computer program to be executed by a computer to perform at least: provide a plurality of agent controllers with a service including causing an output device to output a response of voice, in accordance with an utterance of an occupant of a vehicle, and cause a first agent controller included in the plurality of agent controllers to provide an agent controller different from the first agent controller with first service information on the service to be provided to the occupant.

According to (1), (2), (10), (12), and (13), since the first agent controller provides an agent controller different from the first agent controller with the first service information on the service to be provided to the occupant, the degree of satisfaction of a user can be improved.

According to (3), since the agent device does not provide the occupant with third service information in which the degree of association with the first service information is less than a predetermined degree, it is possible to provide the information useful for the occupant, without providing information that is not useful for the occupant.

According to (4) to (6), since the second agent controller voluntarily provides the occupant with the second service information without depending on the instruction of the occupant, the convenience of the occupant is improved.

According to (7) and (8), the agent device can suppress the provision of information that is not useful for the occupant.

According to (9), since the agent device preferentially provides information on the first service to the agent controller that is good at providing the information on the first service information, it is possible to efficiently acquire useful information.

BRIEF DESCRIPTION OF THE DRAWINGS

FIG. 13 is a diagram showing an example of the contents of agent characteristic information.

DETAILED DESCRIPTION

Hereinafter, an embodiment of an agent device, a method for controlling the agent device, and a storage medium of the present invention will be described with reference to the drawings.

First Embodiment

An agent device is a device that realizes part or all of an agent system. Hereinafter, as an example of an agent device, an agent device mounted on a vehicle (hereinafter, a vehicle M) and including agent functions of a plurality of types will be described. The agent function is, for example, a function of providing various types of information based on a request (command) included in the utterances of an occupant or intermediary network services, while having a conversation with the occupant of the vehicle M. A plurality of types of agents may have different functions, processing procedures, controls, output modes and details, respectively. Some of the agent functions may have a function of controlling apparatuses in the vehicle (for example, devices related to a driving control or a vehicle body control).

The agent function is realized, for example, by integrally using a natural language processing function (a function for understanding a structure and meaning of text), a conversation management function, a network search function for searching for another device via a network or searching for a predetermined database held by the own device or the like, in addition to a voice recognition function for recognizing an occupant's voice (a function for converting speech into text). Some or all of these functions may be realized by an artificial intelligence (AI) technology. Some of the constituents for performing these functions (particularly, the voice recognition function or the natural language processing interpretation function) may be mounted on an agent server (an external device) capable of communicating with an in-vehicle communication device of the vehicle M or a general-purpose communication device brought into the vehicle M. In the following description, it is assumed that some of the configurations are mounted on the agent server, and the agent device and the agent server cooperate to realize an agent system. A service providing entity (service entity) that appears virtually due to cooperation between the agent device and the agent server is referred to as an agent.

<Overall Configuration>

Figure 1:
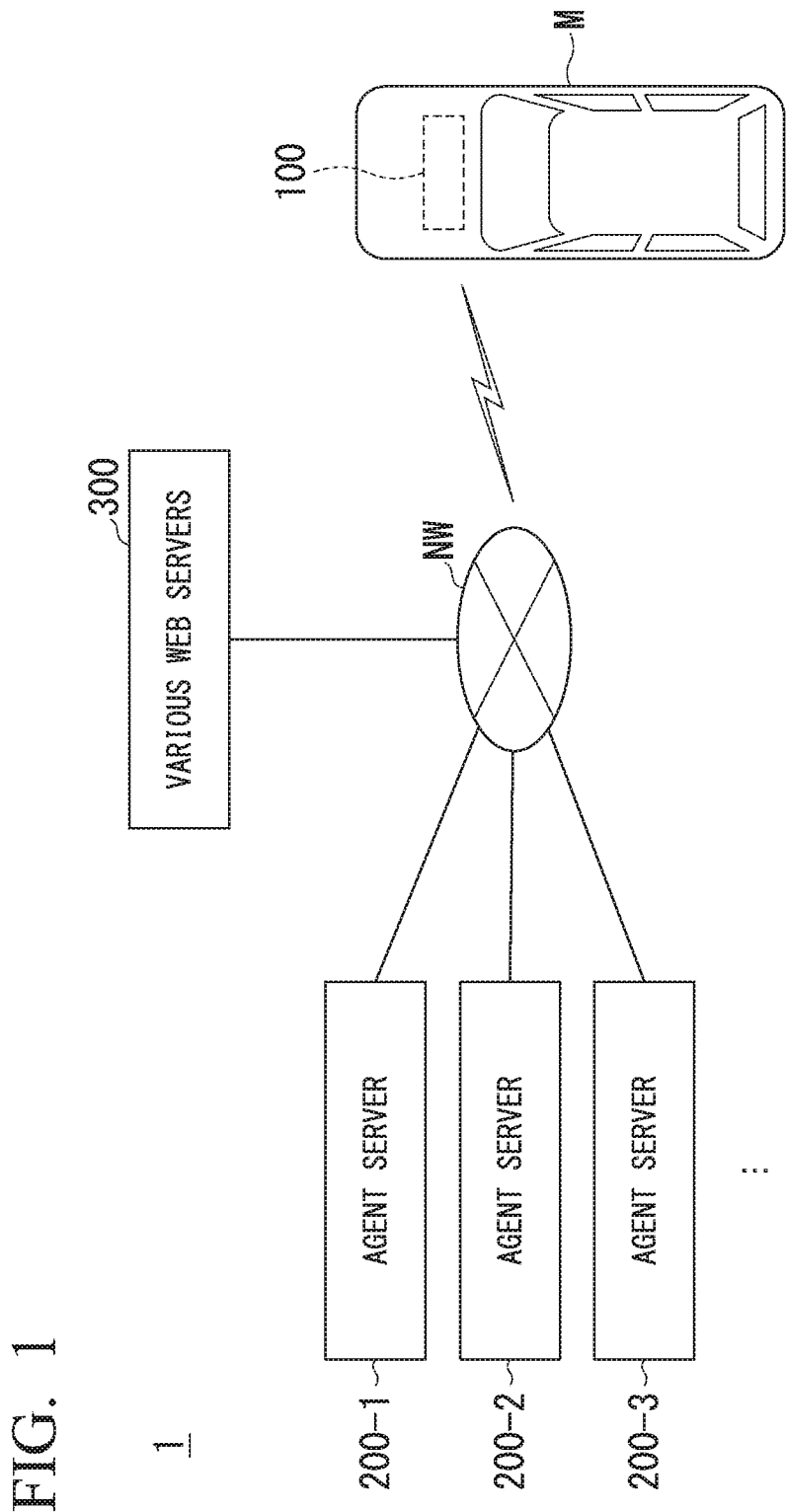
FIG. 1 is a configuration diagram of an agent system including an agent device.

FIG. 1 is a configuration diagram of an agent system 1 including an agent device 100. The agent system 1 is equipped with, for example, the agent device 100 and a plurality of agent servers 200-1, 200-2, 200-3 . . . . The number following the hyphen at the end of the reference numerals is an identifier for distinguishing the agent. When there is no need to distinguish between the agent servers, in some cases, an agent server may be simply referred to as an agent server 200. Although three agent servers 200 are shown in FIG. 1, the number of agent servers 200 may be two and may be four or more. Each agent server 200 is operated by providers of agent systems different from each other. Therefore, the agents in the present invention are agents realized by different providers. The provider includes, for example, an automobile manufacturer, a network service employer, an electronic commerce employer, a mobile terminal seller, and the like, and an arbitrary entity (a corporation, an organization, an individual, or the like) can be a provider of the agent system.

The agent device 100 communicates with the agent server 200 via a network NW. The network NW includes, for example, some or all of the Internet, a cellular network, a Wi-Fi network, a wide area network (WAN), a local area network (LAN), a public line, a telephone line, a wireless base station, and the like. Various web servers 300 are connected to the network NW, and the agent server 200 or the agent device 100 and can acquire web pages from the various web servers 300 via the network NW.

The agent device 100 has a conversation with the occupant of the vehicle M, transmits speech from the occupant to the agent server 200, and presents the answer obtained from the agent server 200 to the occupant in the form of voice output or image display.

First Embodiment

[Vehicle]

Figure 2:
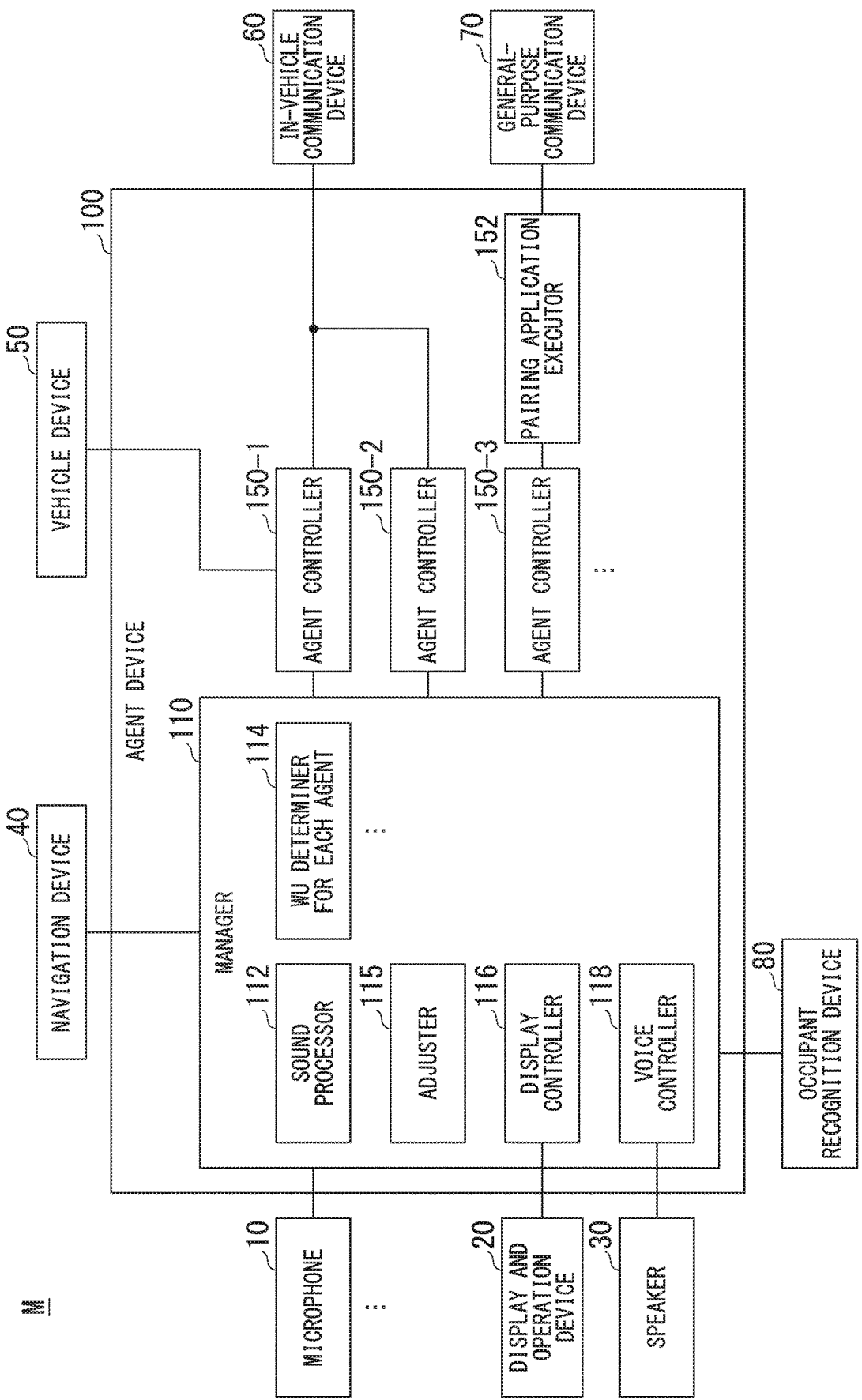
FIG. 2 is a diagram showing a configuration of the agent device according to the first embodiment and apparatuses mounted on a vehicle M.

FIG. 2 is a diagram showing a configuration of the agent device 100 according to the first embodiment and apparatuses mounted on the vehicle M. For example, one or more microphones 10, a display and operation device 20, a speaker 30, a navigation device 40, a vehicle device 50, an in-vehicle communication device 60, an occupant recognition device 80, and an agent device 100 are mounted on the vehicle M. There is a case in which a general-purpose communication device 70 such as a smartphone is brought into a vehicle interior and used as a communication device. These devices are connected to each other by a multiplex communication line such as a controller area network (CAN) communication line, a serial communication line, a wireless communication network, or the like. The configuration shown in FIG. 2 is merely an example, and part of the configuration may be omitted or other constituents may be added thereto.

The microphone 10 is a voice collector that collects speech emitted in the vehicle interior. The display and operation device 20 is a device (or a device group) that displays an image and can accept an input operation. The display and operation device 20 includes, for example, a display device configured as a touch panel. The display and operation device 20 may further include a head up display (HUD) or a mechanical input device. The speaker 30 includes, for example, a plurality of speakers (voice output devices) arranged at different positions in the vehicle interior. The display and operation device 20 may be shared by the agent device 100 and the navigation device 40. Details thereof will be described below.

The navigation device 40 is equipped with a navigation human machine interface (HMI), a positioning device such as a global positioning system (GPS), a storage device that stores map information, and a control device (a navigation controller) that performs route searching and the like. Some or all of the microphone 10, the display and operation device 20, and the speaker 30 may be used as the navigation HMI. The navigation device 40 searches for a route (a navigation route) for moving to a destination which is input by the occupant, from the position of the vehicle M identified by the positioning device, and outputs guidance information using the navigation HMI so that the vehicle M can travel along the route. The route search function may be provided in a navigation server accessible via the network NW. In this case, the navigation device 40 acquires a route from the navigation server and outputs guidance information. The agent device 100 may be constructed on the basis of a navigation controller. In this case, the navigation controller and the agent device 100 are integrally configured in terms of hardware.

The vehicle device 50 includes, for example, a driving force output device such as an engine or a traveling motor, an engine starting motor, a door locking device, a door opening and closing device, a window, an opening and closing device of the window, an opening and closing control device of the window, a seat, a control device of the seat position, a rearview mirror and its angular position control device, lighting devices inside and outside the vehicle and their control devices, a wiper or a defogger and their respective control devices, a direction indicator and its control device, an air conditioner, vehicle information devices such as for mileage, information on tire pressure and remaining fuel information for fuel, and the like.

The in-vehicle communication device 60 is a wireless communication device capable of accessing the network NW using, for example, a cellular network or a Wi-Fi network.

The occupant recognition device 80 includes, for example, a seating sensor, a vehicle interior camera, an image recognition device, and the like. The seating sensor includes a pressure sensor provided below a seat, a tension sensor attached to a seat belt, and the like. The vehicle interior camera is a charge coupled device (CCD) camera or a complementary metal oxide semiconductor (CMOS) camera provided in the vehicle interior. The image recognition device analyzes the image of the vehicle interior camera and recognizes the presence or absence of an occupant for each seat, the face orientation, and the like.

Figure 3:
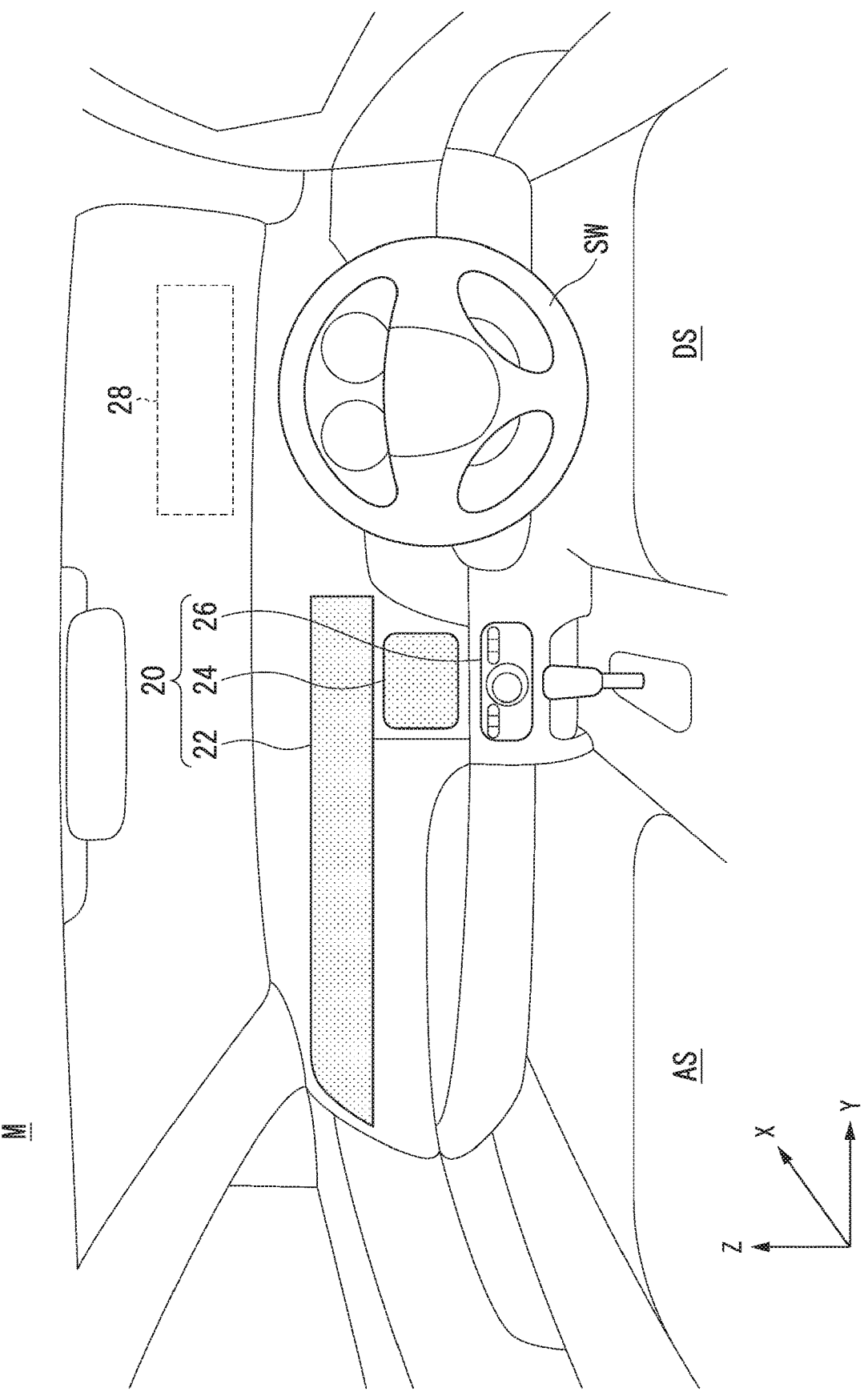
FIG. 3 is a diagram showing an example of arrangement of a display and operation device.

FIG. 3 is a diagram showing an example of the arrangement of the display and operation device 20. The display and operation device 20 includes, for example, a first display 22, a second display 24, and an operation switch ASSY 26. The display and operation device 20 may further include a HUD 28.

The vehicle M includes, for example, a driver's seat DS provided with a steering wheel SW, and an assistant driver's seat AS provided in a vehicle width direction (Y direction in the drawing) with respect to the driver's seat DS. The first display 22 is a horizontally long display device that extends from the vicinity of midway between the driver's seat DS and the assistant driver's seat AS on the instrument panel to a position facing a left end of the assistant driver's seat AS. The second display 24 is installed in the middle between the driver's seat DS and the assistant driver's seat AS in the vehicle width direction and below the first display 22. For example, the first display 22 and the second display 24 are both configured as a touch panel, and include a liquid crystal display (LCD), an organic electroluminescence (EL), a plasma display, or the like as a display. The operation switch ASSY 26 has a dial switch, a button switch, and the like integrated therein. The display and operation device 20 outputs the details of the operation performed by the occupant to the agent device 100. The contents displayed on the first display 22 or the second display 24 may be determined by the agent device 100.

Figure 4:
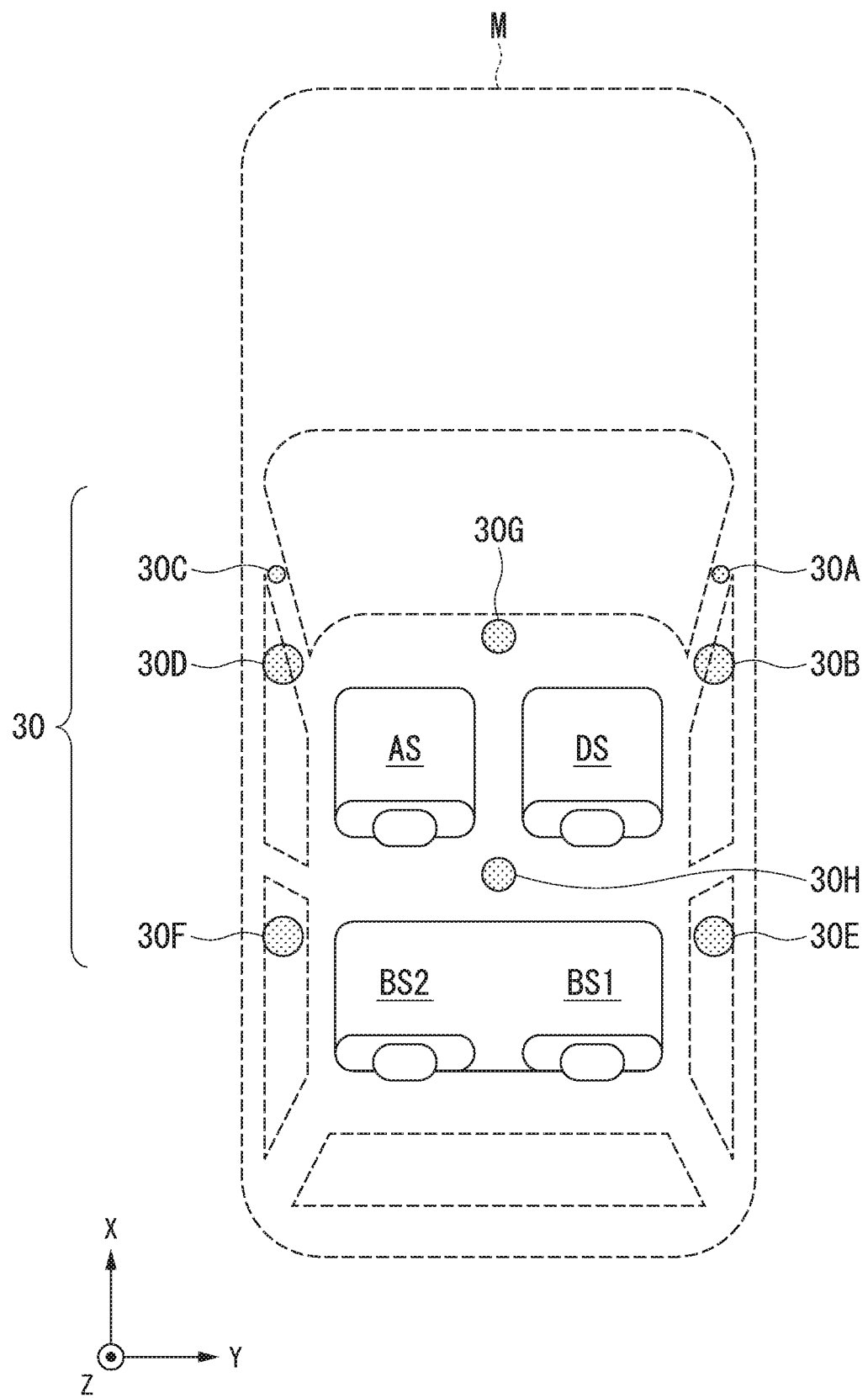
FIG. 4 is a diagram showing an example of the arrangement of a speaker.

FIG. 4 is a diagram showing an example of the arrangement of the speaker 30. The speaker 30 includes, for example, speakers 30A to 30H. A speaker 30A is installed on a window post (a so-called A pillar) on the driver's seat DS side. The speaker 30B is installed below the door near the driver's seat DS. A speaker 30C is installed on a window post on the assistant driver's seat AS side. A speaker 30D is installed below the door near the assistant driver's seat AS. A speaker 30E is installed below the door near a right rear seat BS1. A speaker 30F is installed below the door near the left rear seat BS2. A speaker 30G is installed near the second display 24. A speaker 30H is installed on a ceiling (roof) of the vehicle interior.

In such an arrangement, for example, when speech is exclusively output from the speakers 30A and 30B, the sound image is localized near the driver's seat DS. When speech is exclusively output from the speakers 30C and 30D, the sound image is localized near the assistant driver's seat AS. When voice is exclusively output from the speaker 30E, the sound image is localized near the right rear seat BS1. When voice is exclusively output from the speaker 30F, the sound image is localized near the left rear seat BS2. When voice is exclusively output from the speaker 30G, the sound image is localized near the front of the vehicle interior. When voice is exclusively output from the speaker 30H, the sound image is localized near the upper part of the vehicle interior. The speaker 30 can localize the sound image at an arbitrary position in the vehicle interior, by adjusting the distribution of the voice output from each speaker using a mixer or an amplifier, without being limited thereto.

[Agent Device]

Returning to FIG. 2, the agent device 100 is equipped with a manager 110, agent controllers 150-1, 150-2 and 150-3, and a pairing application executor 152. The manager 110 is equipped with, for example, a sound processor 112, a wake up (WU) determiner 114 for each agent, an adjuster 115, a display controller 116, and a voice controller 118. When no distinction is made between the agent controllers, the agent controller is simply referred to as the agent controller 150. The illustration of the three agent controllers 150 is merely an example associated with the number of agent servers 200 in FIG. 1, and the number of agent controllers 150 may be two or may be four or more. The software arrangement shown in FIG. 2 is simply shown for the sake of explanation. Actually, for example, the manager 110 may be interposed between the agent controller 150 and the in-vehicle communication device 60 or can be arbitrarily modified.

Each constituent element of the agent device 100 is realized, for example, by executing a program (software) through a hardware processor such as a central processor (CPU). Some or all of these constituent elements may be realized by hardware (a circuit unit including circuitry) such as a large scale integration (LSI), an application specific integrated circuit (ASIC), a field-programmable gate array (FPGA), and a graphics processor (GPU), or may be realized by cooperation of software and hardware. The program may be stored in advance in a storage device such as a hard disk drive (HDD) or a flash memory (a storage device having a non-transitory storage medium), or the program may be stored in a removable storage medium (a non-transitory storage medium) such as a DVD or a CD-ROM and may be installed by mounting the storage medium on a drive device.

The manager 110 functions by executing a program such as an operating system (OS) or middleware.

The sound processor 112 of the manager 110 performs sound processing on the input sound so as to be in a state suitable for recognizing a wake-up word which is set for each agent in advance.

The WU determiner 114 for each agent exists to correspond to (associated with) each of the agent controllers 150-1, 150-2 and 150-3, and recognizes a wake-up word that is predetermined for each agent. The WU determiner 114 for each agent recognizes the meaning of the voice from the voice (voice stream) on which the sound processing is performed. First, the WU determiner 114 for each agent detects a voice section on the basis of the amplitude and the zero crossing of the voice waveform in the voice stream. The WU determiner 114 for each agent may perform a section detection based on voice identification and non-voice identification in frame units based on a Gaussian mixture model (GMM).

Next, the WU determiner 114 for each agent converts the voice in the detected voice section into text, and sets the text as character information. Further, the WU determiner 114 for each agent determines whether the character information converted into text corresponds to (associates with) a wake-up word. When it is determined that the character information is the wake-up word, the WU determiner 114 for each agent starts the corresponding (associated) agent controller 150. A function associated with the WU determiner 114 for each agent may be mounted on the agent server 200. In this case, the manager 110 transmits the voice stream on which the sound processing is performed by the sound processor 112 to the agent server 200, and if the agent server 200 determines that the voice stream has a wake-up word, the agent controller 150 starts in accordance with an instruction from the agent server 200. Each of the agent controllers 150 may always start and may determine the wake-up word by itself. In this case, the manager 110 does not need to include the WU determiner 114 for each agent.

The agent controller 150 provides a service including the operation of causing an agent to appear in cooperation with the corresponding (associated) agent server 200 and causing the output device to output a response by speech, depending on the utterance of the occupant of the vehicle. The agent controller 150 may include a unit to which authority to control the vehicle device 50 is given. The agent controller 150 may communicate with the agent server 200 in cooperation with the general-purpose communication device 70 via the pairing application executor 152. For example, the authority to control the vehicle device 50 may be given to the agent controller 150-1. The agent controller 150-1 communicates with the agent server 200-1 via the in-vehicle communication device 60. The agent controller 150-2 communicates with the agent server 200-2 via the in-vehicle communication device 60. The agent controller 150-3 communicates with the agent server 200-3 in cooperation with the general-purpose communication device 70 via the pairing application executor 152.

The pairing application executor 152 performs pairing with the general-purpose communication device 70 using, for example, Bluetooth (registered trademark), and connects the agent controller 150-3 and the general-purpose communication device 70. The agent controller 150-3 may be connected to the general-purpose communication device 70 by wired communication using a universal serial bus (USB) or the like. Hereinafter, in some cases, an agent which appears by cooperation of the agent controller 150-1 and the agent server 200-1 is referred to as an agent 1, an agent which appears by cooperation of the agent controller 150-2 and the agent server 200-2 is referred to as an agent 2, and an agent which appears by cooperation of the agent controller 150-3 and the agent server 200-3 is referred to as an agent 3.

The adjuster 115 provides the agent controller 150 different from predetermined agent controller with information on a service, which is provided to an occupant by the predetermined agent controller 150. Details of the process to be performed by the adjuster 115 will be described below.

The display controller 116 displays an image on the first display 22 or the second display 24 depending on an instruction from the agent controller 150. Hereinafter, the first display 22 is assumed to be used. The display controller 116 generates an image of a personified agent (hereinafter, referred to as an agent image) that communicates with an occupant in the vehicle interior, by the control of some of the agent controller 150 and displays the generated agent image on the first display 22. The agent image is, for example, an image in a mode of talking to the occupant. The agent image may include, for example, at least a face image to such an extent that facial expressions and a facial orientation are able to be recognized by a viewer (occupant). For example, in the agent image, parts simulating eyes and a nose may be represented in the face area, and the facial expression and the facial direction may be recognized on the basis of the positions of these parts in the face area. The agent image is an image that is perceived three-dimensionally by a viewer and in which the facial orientation of the agent can be recognized due to a head image being included in a three-dimensional space. The agent image may include an image of a main body (torso or limbs) in which the operation, behavior, posture, and the like of the agent are recognized. The agent image may be an animated image.

The voice controller 118 causes some or all of the speakers included in the speaker 30 to output voice, depending on the instruction from the agent controller 150. The voice controller 118 may perform a control of localizing the sound image of the agent voice at a position associated with the display position of the agent image, using the plurality of speakers 30. The position associated with the display position of the agent image is, for example, a position at which the occupant is expected to feel that the agent image is speaking the agent voice, and specifically, a position near the display position of the agent image (for example, within 2 to 3 [cm]). The localization of the sound image means that the spatial position of the voice source felt by the occupant is determined, for example, by adjusting the volume of the voice to be transmitted to the left and right ears of the occupant.

Figure 5:
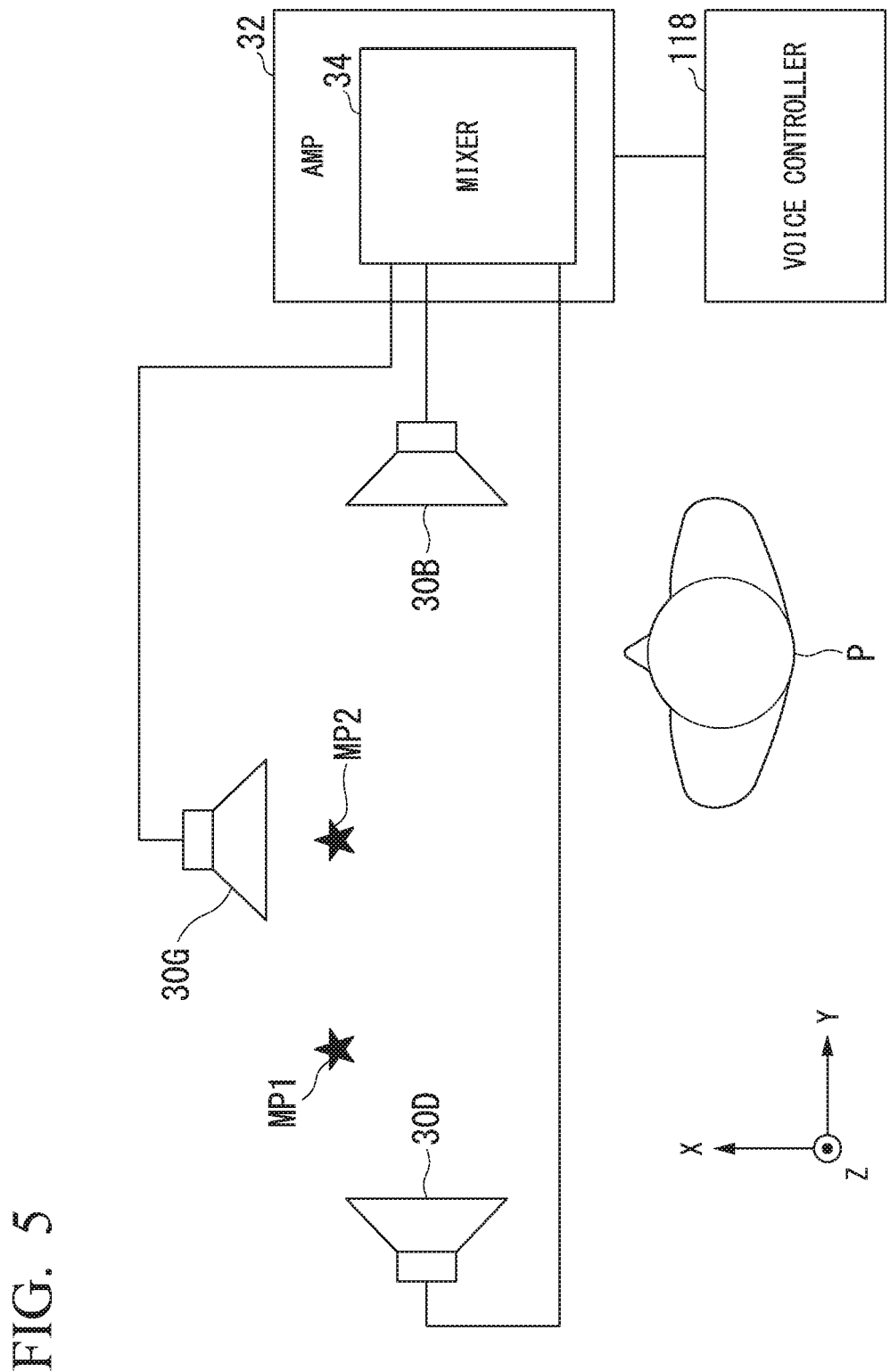
FIG. 5 is a diagram for explaining a principle of determining a position at which a sound image is localized.

FIG. 5 is a diagram for explaining the principle of determining the position at which the sound image is localized. Although FIG. 5 shows an example in which the above-described speakers 30B, 30D, and 30G are used for simplification of explanation, any speaker included in speaker 30 may be used. The voice controller 118 controls an amplifier (AMP) 32 and a mixer 34 connected to each speaker such that a sound image is localized. For example, when the sound image is localized at the spatial position MP1 shown in FIG. 5, the voice controller 118 controls the amplifier 32 and the mixer 34, thereby causing the speaker 30B to output 5% of the maximum intensity, causing the speaker 30D to output 80% of the maximum intensity, and causing the speaker 30G to output 15% of the maximum intensity. As a result, from the position of the occupant P, it is felt that the sound image is localized at the spatial position MP1 shown in FIG. 5.

When the sound image is localized at the spatial position MP2 shown in FIG. 5, the voice controller 118 controls the amplifier 32 and the mixer 34, thereby causing the speaker 30B to output 45% of the maximum intensity, causing the speaker 30D to output 45% of the maximum intensity, and causing the speaker 30G to output 45% of the maximum intensity. As a result, from the position of the occupant P, it is felt that the sound image is localized at the spatial position MP2 shown in FIG. 5. In this way, the position at which the sound image is localized can be changed, by adjusting the plurality of speakers provided in the vehicle interior and the loudness of the voice output from each speaker. More specifically, since the position at which the sound image is localized is determined on the basis of the voice characteristics originally held by the voice source, information on the vehicle interior environment, and a head-related transfer function (HRTF), the voice controller 118 may localize the sound image at a predetermined position, by controlling the speaker 30 with an optimum output distribution obtained in advance by a sensory test or the like.

[Agent Server]

Figure 6:
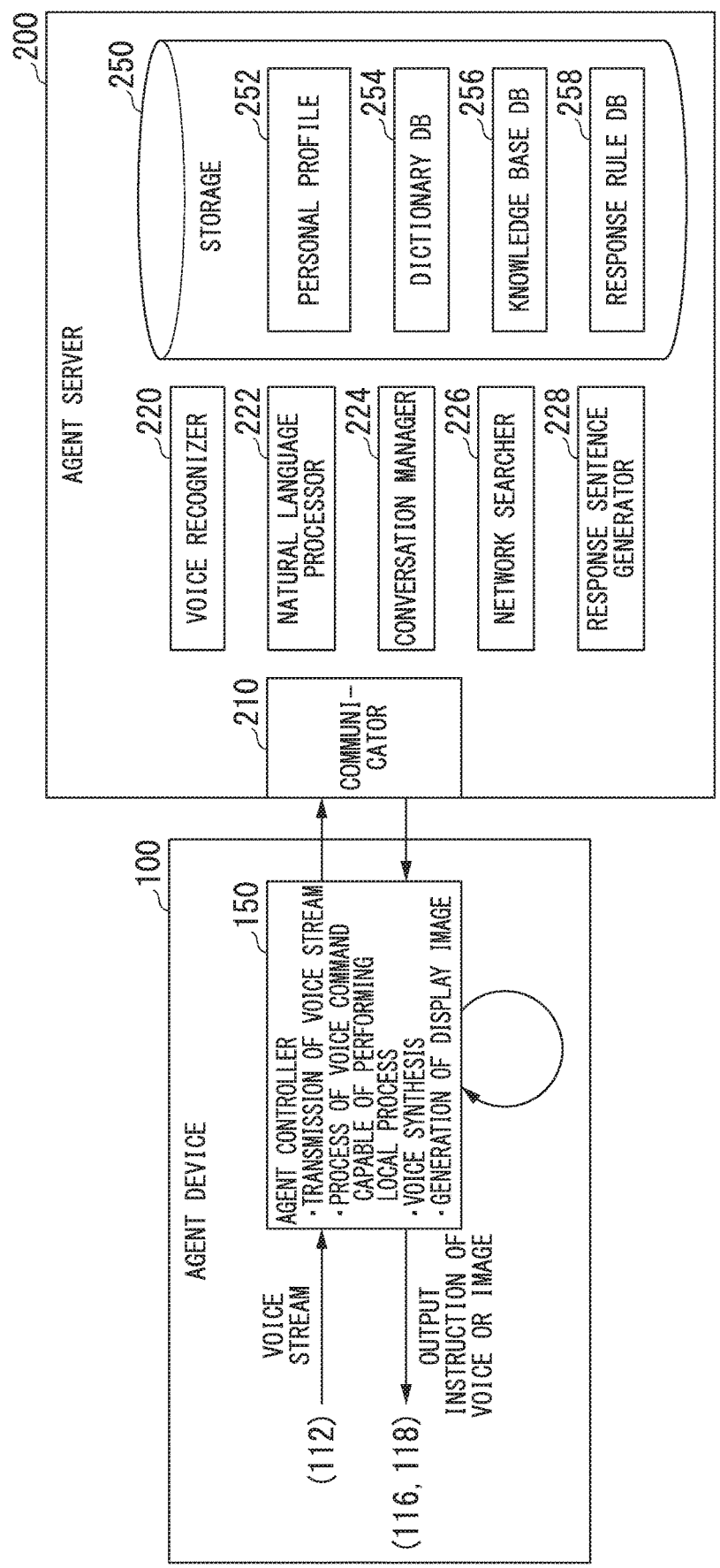
FIG. 6 is a diagram showing a configuration of an agent server and part of a configuration of an agent device.

FIG. 6 is a diagram showing the configuration of the agent server 200 and some of the configuration of the agent device 100. Hereinafter, the operation of the agent controller 150 and the like together with the configuration of the agent server 200 will be described. Here, description of physical communication from the agent device 100 to the network NW will not be provided.

The agent server 200 is equipped with a communicator 210. The communicator 210 is a network interface such as a network interface card (NIC). Further, the agent server 200 is equipped with, for example, a voice recognizer 220, a natural language processor 222, a conversation manager 224, a network searcher 226, and a response sentence generator 228. These constituent elements are realized, for example, by executing a program (software) through a hardware processor such as a CPU. Some or all of these constituent elements may be realized by hardware (a circuit unit including circuitry) such as an LSI, an ASIC, an FPGA, and a GPU, or may be realized by cooperation of software and hardware. The program may be stored in a storage device such as an HDD or a flash memory (a storage device equipped with a non-transitory storage medium) in advance, or may be stored in a removable storage medium such as a DVD or a CD-ROM (a non-transitory storage medium) and may be installed by mounting the storage medium on a drive device.

The agent server 200 is equipped with a storage 250. The storage 250 is realized by the aforementioned various storage devices. The storage 250 stores data and programs such as a personal profile 252, a dictionary (database DB) 254, a knowledge base DB 256, and a response rule DB 258.

In the agent device 100, the agent controller 150 transmits a voice stream or a voice stream subjected to processing such as compression or encoding to the agent server 200. When recognizing a voice command capable of performing the local processing (processing not passing through the agent server 200), the agent controller 150 may perform the processing requested by the voice command A voice command for which local processing is possible is a voice command that can be answered by referring to a storage (not shown) included in the agent device 100, or is a voice command (for example, a command to turn on the air conditioner) that controls the vehicle device 50 in the case of the agent controller 150-1t. Therefore, the agent controller 150 may have some of the functions of the agent server 200.

When the agent device 100 acquires the voice stream, the voice recognizer 220 performs voice recognition and outputs character information converted into text, and the natural language processor 222 performs semantic interpretation on the character information, while referring to the dictionary DB 254. The dictionary DB 254 is obtained by associating character information with abstracted semantic information. The dictionary DB 254 may include list information of synonyms. Steps of the processing of the voice recognizer 220 and the processing of the natural language processor 222 need not be clearly separated, and may be performed such that they mutually influence each other, in such a manner that the voice recognizer 220 may correct the recognition results when receiving the processing results of the natural language processor 222.

The natural language processor 222 generates a command replaced with standard character information "Today's weather" when the meaning such as "What is the weather today" or "How is the weather" is recognized as a result of the recognition, for example. As a result, even when the voice of the request has character fluctuations, it is possible to easily perform the requested conversation. The natural language processor 222 may, for example, recognize the meaning of the character information using artificial intelligence processing such as machine learning processing using probability, or may generate a command based on the result of recognition.

The conversation manager 224 determines the contents of the utterance to the occupant of the vehicle M, while referring to the personal profile 252, the knowledge base DB 256, and the response rule DB 258, on the basis of the processing result (command) of the natural language processor 222. The personal profile 252 includes personal information of the occupant, hobbies and preferences, a history of past conversations, and the like stored for each occupant. The knowledge base DB 256 is information that defines a relationship between things. The response rule DB 258 is information that defines an operation to be performed by the agent with respect to the command (such as an answer or the contents of the device control).

The conversation manager 224 may specify the occupant by performing collation with the personal profile 252, using the feature information obtained from the voice stream. In this case, in the personal profile 252, for example, personal information is associated with voice feature information. The feature information of voice is, for example, information on features of a speaking style such as a pitch, an intonation, and a rhythm (pitch pattern of sound) of speech, and feature amounts due to Mel Frequency Cepstrum Coefficients. The feature information of voice is, for example, information obtained by causing the occupant to utter a predetermined word or sentence at the time of initial registration of the occupant, and recognizing the speech.

If the command requests information that can be searched for via the network NW, the conversation manager 224 causes the network searcher 226 to search therefor. The network searcher 226 accesses various web servers 300 via the network NW and acquires desired information. The expression "information that can be searched via the network NW" is, for example, a result of an evaluation obtained by a general user of a restaurant near the vehicle M or a weather forecast according to the position of the vehicle M on that day.

The response sentence generator 228 generates a response sentence so that the contents of the utterance determined by the conversation manager 224 are transmitted to the occupant of the vehicle M, and transmits the generated response sentence to the agent device 100. When the occupant is specified as an occupant registered in the personal profile, the response sentence generator 228 may call the name of the occupant or may generate a response sentence in a speaking style similar to that of the occupant. If the conversation manager 224 determines that music should be provided to the occupant, the process of the response sentence generator 228 is omitted, and the information of the music obtained on the basis of the search result of the network searcher 226 is provided to the agent controller 150.

Hereinafter, when there is no need to distinguish between a response sentence and information provided to the occupant such as music, it may be referred to as "response information".

When the agent controller 150 acquires the response sentence, the agent controller 150 instructs the voice controller 118 to perform voice synthesis and output voice. The agent controller 150 instructs the display controller 116 to display the image of the agent in accordance with the voice output. In this way, an agent function in which the virtually appearing agent responds to the occupant of the vehicle M is realized.

[Response of Agent Controller]

Figure 7:
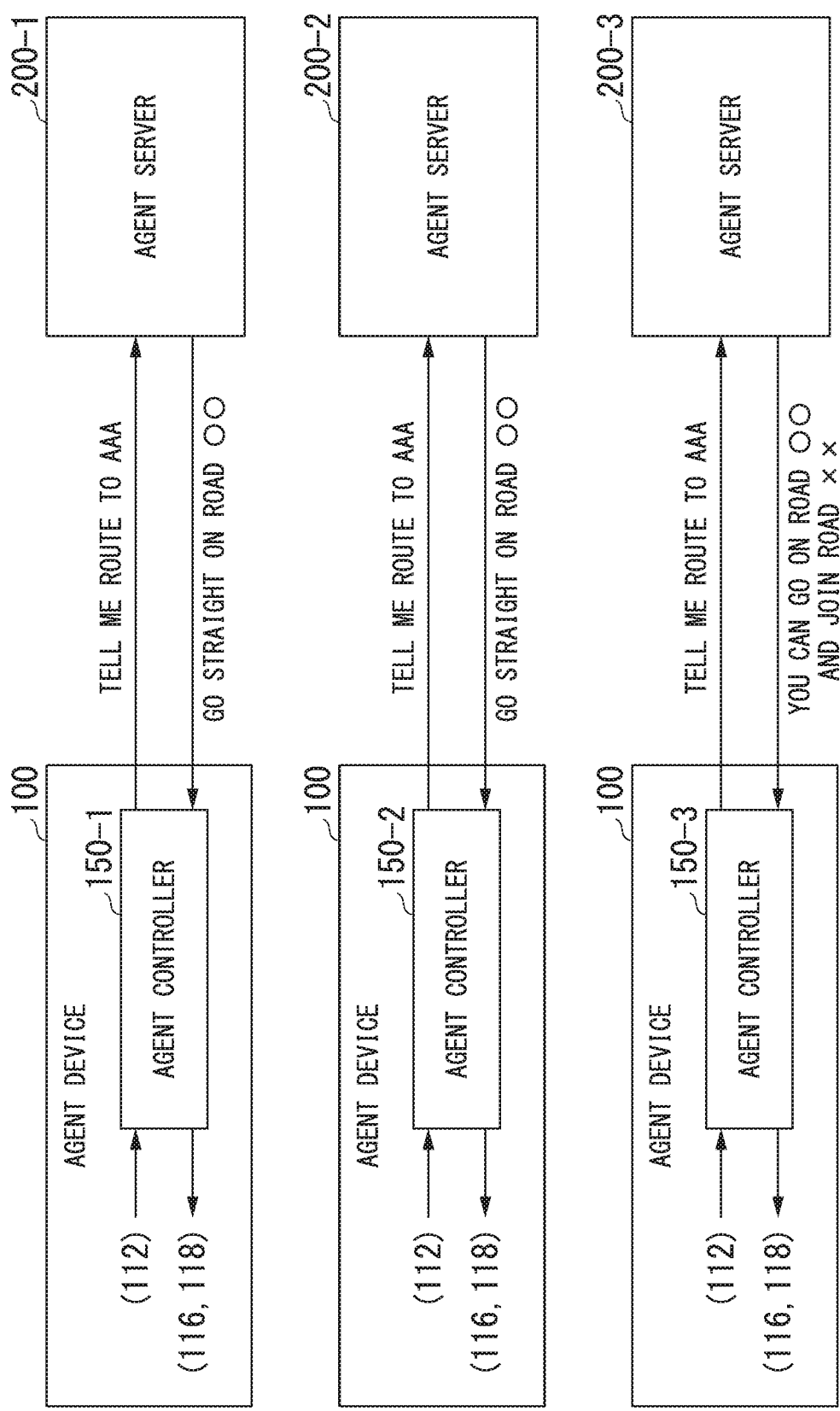
FIG. 7 is a diagram for explaining an outline of response information which is provided to an agent server.

FIG. 7 is a diagram for explaining an outline of response information to be provided to the agent server 200. Although the basic functional configurations and processing contents of each of the agent servers 200-1, 200-2, and 200-3 are the same, in some cases, the information thereof, the algorithm used by the function unit for the processing and the like may be different from each other. For this reason, when the occupant inputs a predetermined utterance to the agent server 200 via the agent device 100, the contents of the response information to be provided to the agent device 100 by the agent server 200 may be the same or similar or may be different.

For example, even if the algorithm used by each agent server 200 is the same, when the information stored in the storage s 250 of each agent server 200 is different, the response information may be different. For example, even if the information stored in the storage s 250 of each agent server 200 is the same, when the algorithm used by the agent server 200 is different, the response information may be different.

For example, as shown in FIG. 7, when the occupant makes an inquiry "tell me the route to AAA" to the agent controllers 150-1 to 150-3, the agent controllers 150-1 and 150-2 may return the same response, and the agent controller 150-3 may make a different response from other agent controllers.

As described above, since the characteristics of each agent server 200 are different, the manager 110 (adjuster 115) performs processing in consideration of these characteristics.

[Process of Manager (Part 1)]

Figure 8:
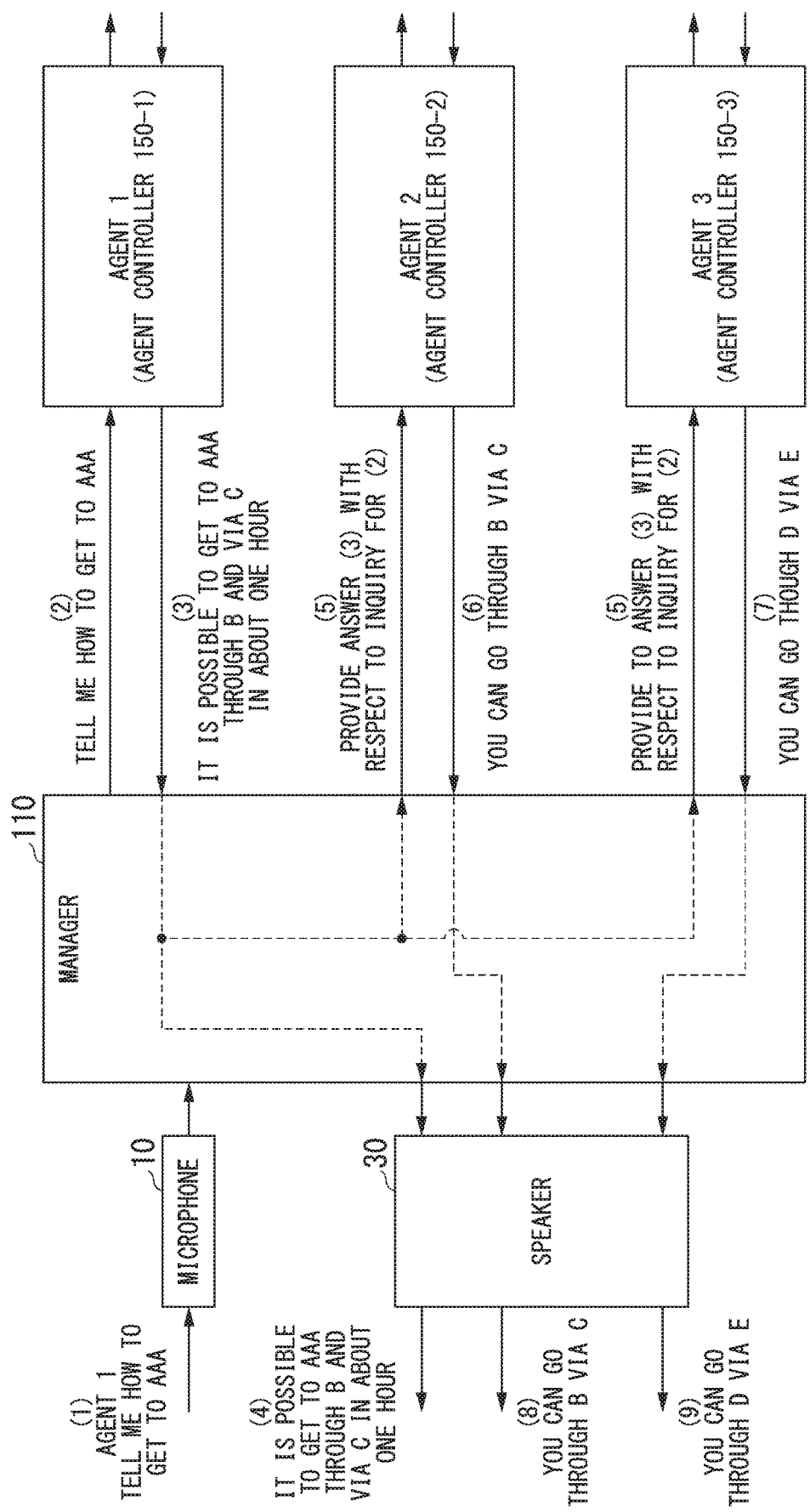
FIG. 8 is a diagram (part 1) for explaining the contents of a process which is performed by a manager.

FIG. 8 is a diagram (part 1) for explaining the contents of the process to be performed by the manager 110.

(1) When the occupant inputs the wake-up word to the microphone 10 and the agent 1 starts, and then inputs "tell me how to get to AAA" to the microphone 10, (2) the manager 110 transmits a voice stream associated with the input voice to the agent 1. (3) The agent 1 acquires response information provided by the agent server 200 depending on the transmitted voice stream, and transmits the acquired response information to the manager 110. (4) Therefore, the response information is provided to the occupant.

(5) The manager 110 provides the agent 2 and the agent 3 with information on the contents of the utterance performed by the occupant and the response information provided to the occupant by the agent 1. That is, the agent controller 150 provides an agent controller 150 different from the aforementioned agent controller 150 with at least response information, which is provided to the occupant. Here, the response information to be provided to the occupant is, for example, information indicating a result of a search for a destination performed by the occupant of the vehicle. One or both of the response information and the utterance of occupant are examples of "first service information on a service provided to the occupant". The process of aforementioned (5) may be performed before the process of aforementioned (4).

(6) The agent 2 provides the manager 110 with response information on the aforementioned (5) information. The response information on the aforementioned (5) information is the response information provided by the agent server 200-2 according to the voice stream of the aforementioned (2).

(7) The agent 3 provides the manager 110 with response information on the aforementioned (5) information. The response information on the aforementioned (5) information is the response information provided by the agent server 200-3 in accordance with the voice stream of the aforementioned (2).

For example, the agents 2 and 3 provide the manager 110 with the contents of the utterance made by the occupant provided by the agent server 200 (200-2 and 200-3) and the response information provided by the agent 1 to the occupant. (8), (9) The manager 110 provides the response information provided in aforementioned (6) and (7) to the occupant.

Figure 9:
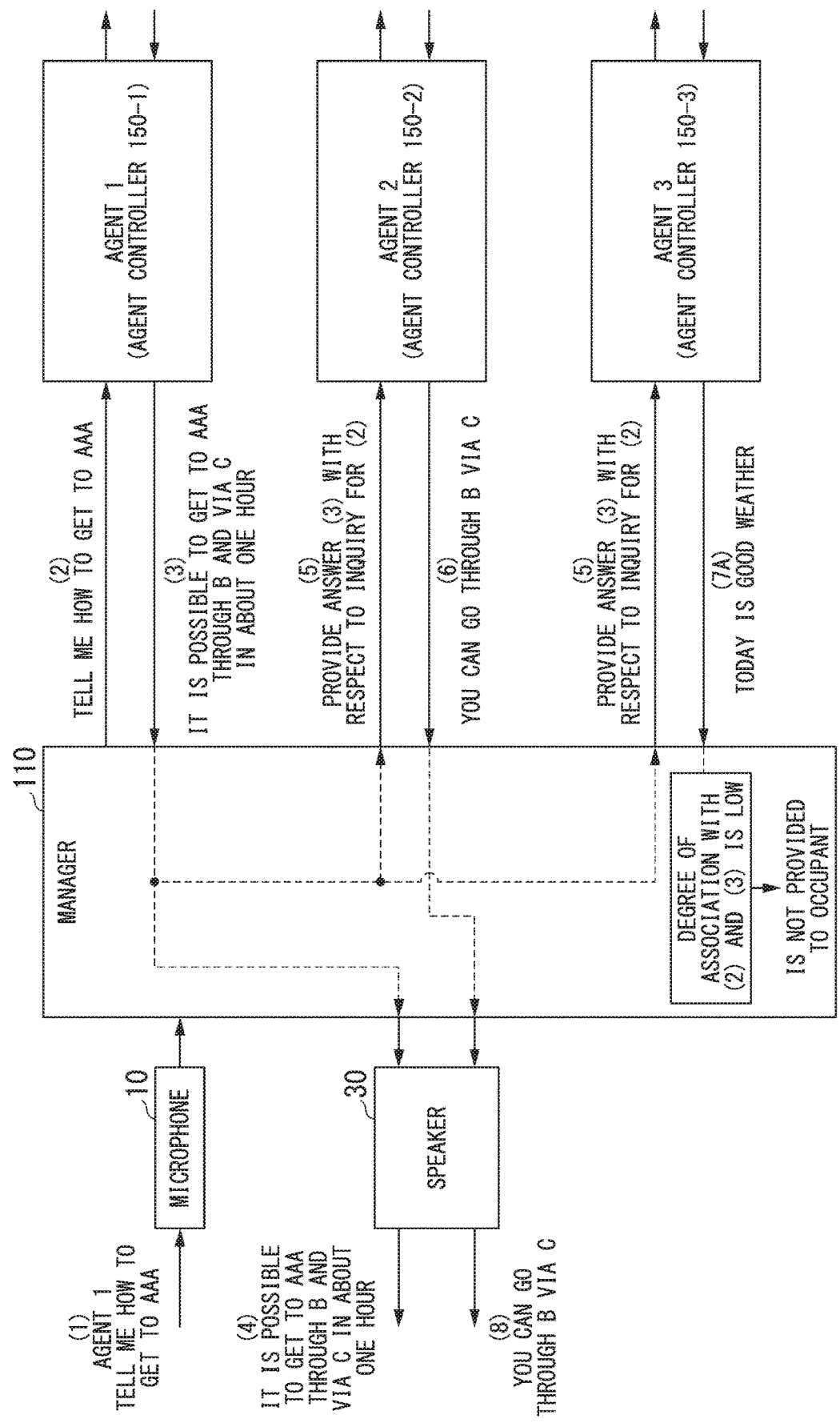
FIG. 9 is a diagram for explaining handling of response information having a degree of association less than a predetermined degree.

Here, the agent controllers 150-2 and 150-3 can provide the occupant with response information (second service information) on the response information, for example, in accordance with the response information provided by the agent controller 150-1. The agent controllers 150-2 and 150-3 voluntarily provide the response information to the occupants, independently of the instructions of the occupants. For example, the response information (second service information) provided by the agent controllers 150-2 and 150-3 in accordance with the response information provided by the agent controller 150-1 is response information in which a degree of association with the response information provided by the agent controller 150-1 is equal to or higher than a predetermined degree. In other words, as shown in FIG. 9, the agent controllers 150-2 and 150-3 do not provide the occupant with response information (third service information) in which the degree of association with the response information provided by the agent controller 150-1 is less than a predetermined degree, but the agent controllers 150-2 and 150-3 provide the occupant with response information (second service information) having a degree of association equal to or higher than a predetermined degree. Details of the degree of association will be described below.

FIG. 9 is a diagram for explaining how to handle response information having a degree of association less than a predetermined degree. A description similar to that of FIG. 8 will not be provided. In the process of (7A), for example, when the agent controller 150-3 generates response information in which the degree of association with the response information of the agent controller 150-1 is less than a predetermined degree, on the basis of one or both of the utterance of occupant and the response information of the agent controller 150-1, the manager 110 does not provides the occupant with response information having a degree of association lower than the predetermined degree.

Instead of the degree of association with the response information generated by the agent controller 150-1, the degree of association with response information in which the degree of association with the utterance of occupant is less than a predetermined degree, or the degree of association with the response information in which the degree of association with the utterance of occupant and the response information generated by the agent controller 150-1 is less than a predetermined degree may be used for processing.

Here, the degree of association will be described. The response information (second service information) having a degree of association equal to or higher than a predetermined degree is, for example, response information provided by another agent, the response information is information in which a general person presumes that the another agent provides, or the response information is information in which a general person determines (or predetermined person determined) that the degree of association with respect to the utterance of the occupant or the response information provided by the agent (hereinafter referred to as first service information) is equal to or higher than a predetermined degree. This determination may be obtained experimentally in advance, or may be a degree of association derived, on the basis of the meaning of the sentence or words included in the first service information and the meaning of the sentence or words included in the response information provided to another agent. For example, the manager 110 may generate first service information vector obtained by vectorizing the first service information (for example, a word included in the first service information), and a response vector obtained by vectorizing the response information (for example, a word of response information), using a natural language analysis technique. Further, the manager 110 may derive a cosine similarity between the first service information vector and the response vector, and determines the response information having a derived cosine similarity equal to or greater than a predetermined degree as response information in which the degree of association with the first service information is equal to or greater than the predetermined degree.

For example, when the utterance of occupant is a route search to a predetermined point, response information having a degree of degree of association equal to or higher than a predetermined degree includes response information of the weather or response information of current events related to the route search or the route (including the destination), information on point of interesting (POI) related to the route search or the route, music (melody or back ground music (BGM) suitable for the route) related to the route search or the route, knowledge information (general knowledge) related to the route search or the route, and information such as a route different from the route proposed by the other agent controller 150. More specifically, when the agent controller 150-1 proposes the route A, information on the route B different from the route A, information on recommended shops existing near the route A, the weather of the route A, an event related to route A, a melody that matches the route A, extensive knowledge related to the route A, and the like are information in which the degree of association is equal to or higher than a predetermined level.

As described above, in the agent device 100, since the first agent controller 150 (for example, the agent controller 150-1) included in the plurality of agent controllers 150 provides the first response information on the service, which is provided to the occupant, to the second agent controller 150 (the agent controller 150-2) different from the first agent controller 150, a degree of satisfaction of a user can be improved.

[Process of Manager (Part 2)]

The agent controller 150-2 can provide the occupant with the second response information (fourth service information) on the first response information, depending on the first response information (first service information) provided by the agent controller 150-1, and if the similarity between the first response information and the second response information is equal to or greater than a predetermined degree, the agent controller 150-2 does not provide the second response information to the occupant. When the similarity between the first response information and the second response information is less than a predetermined degree, the agent controller 150-2 provides the occupant with the second response information.

The agent controller 150-2 can provide the occupant with the second response information (fourth service information) on the information provided by the agent controller 150-1, depending on one or both of the utterance of the occupant and the first response information provided by the agent controller 150-1, and if the similarity between the information provided by the agent controller 150-1 and the second response information is equal to or more than a predetermined degree, the agent controller 150-2 may not provide the occupant with the second response information, and if the similarity is less than the predetermined degree, the agent controller 150-2 may provide the occupant with the second response information.

Figure 10:
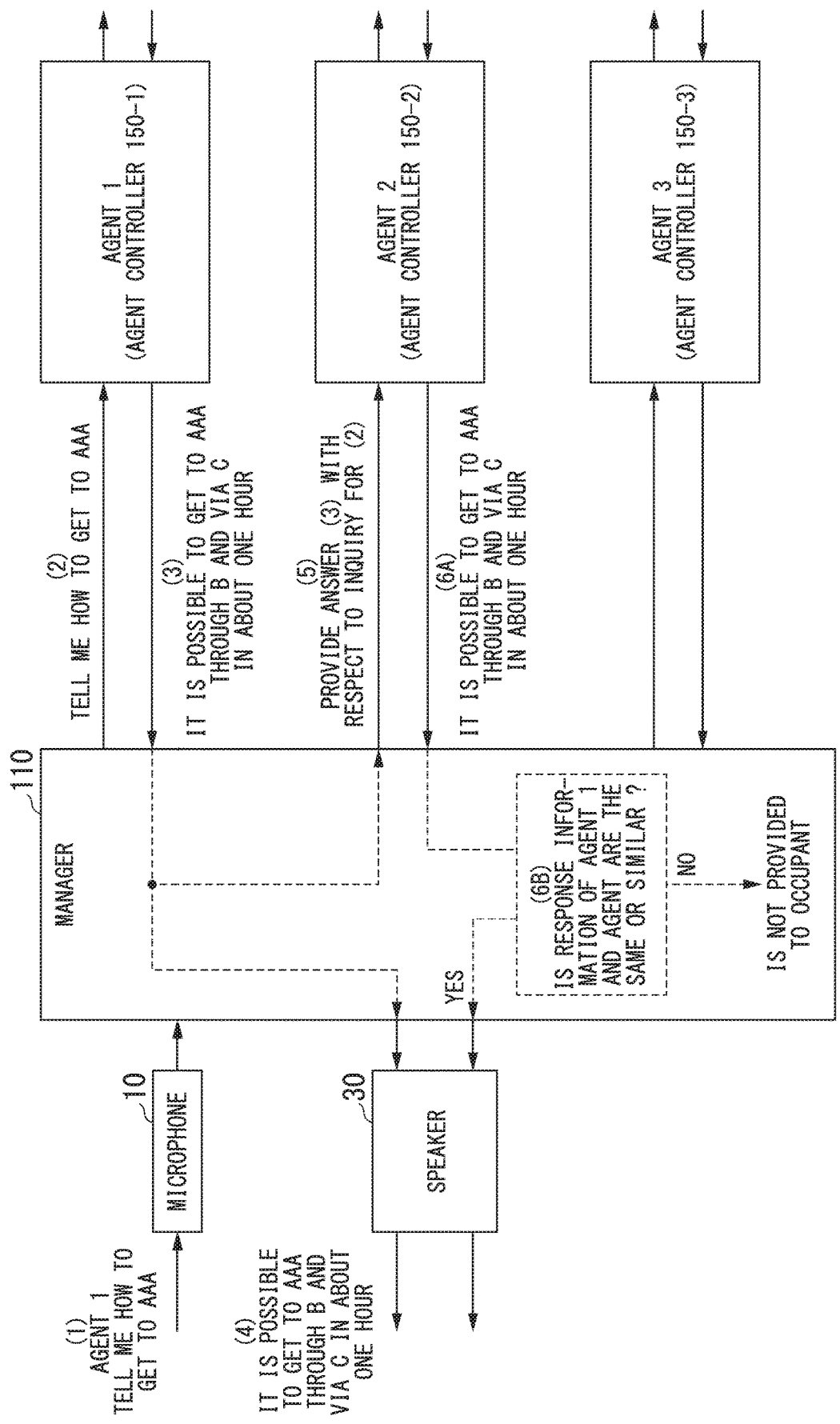
FIG. 10 is a diagram (part 2) for explaining the contents of the process which is performed by the manager.

FIG. 10 is a diagram (part 2) for explaining the contents of the process performed by the manager 110. Since the processes of the aforementioned (1) to (5) in FIG. 10 are the same as the processes of the aforementioned (1) to (5) of FIG. 8, the explanation thereof will not be provided. Since the contents of the process performed by the agent controller 150-3 are the same as those in the example of FIG. 8, the explanation and showing thereof will not be provided.

(6A) The agent 2 provides the manager 110 with response information on the aforementioned (5) information. The process of (6A) is, for example, a process performed after the process of (5). (6B) The manager 110 determines whether the response information provided by the agent 1 in the (3) and the response information provided by the agent 2 in (6A) are the same or similar. The term "same" means that the contents of the response information are the same. For example, if the response information of the agent 1 is that "it is possible to get to AAA through B and via C in about one hour", in a case in which the contents of the response information of the agent 2 are the same as this, the contents of the response information are the same.

The term "similar" means that the contents of the response information are similar to each other by a predetermined degree or more. For example, when the nouns included in the response information match, or when the meanings recognized on the basis of the response information are the same or similar, it is determined that the contents of the response information are similar by a predetermined degree or more. The similarity may be determined on the basis of a known method of determining the similarity of a sentence or the like. For example, the manager 110 may vectorize two pieces of response information to be compared, derive the cosine similarity of the vectorized vector, and determine that the response information having the derived cosine similarity equal to or greater than a predetermined degree is similar.

If the response information is a musical piece, the manager 110 specifies the identification information of the musical piece with reference to the musical piece database stored in the storage device. When the identification information of the musical piece provided by the agent controller 150 matches the identification information of the musical piece provided by the other agent controller 150, the manager 110 may determine that the musical pieces are similar (identical).

When it is determined that the musical pieces are the same or similar in the aforementioned (6B), the manager 110 does not provide the occupant with the response information (fourth service information) provided by the agent 2. When it is determined that the musical pieces are the same or similar in the aforementioned (6B), the manager 110 provides the occupant with the response information (fourth service information) provided by the agent 2.

As described above, since the agent device 100 provides the occupant with response information in which the "degree of association" with the information (or the utterance of the occupant) provided by the agent 1 is equal to or more than a predetermined degree and does not provide the occupant with response information having the "degree of association degree" less than the predetermined degree, it is possible to provide the useful information for the occupant. Since the agent device 100 does not provide the occupant with the response information in which the "similarity" with the information provided by the agent 1 is equal to or more than the predetermined degree and provides the occupant with the response information having the "similarity" less than the predetermined degree, it is possible to suppress provision of information that is not useful for the occupant.

[Flowchart]

Figure 11:
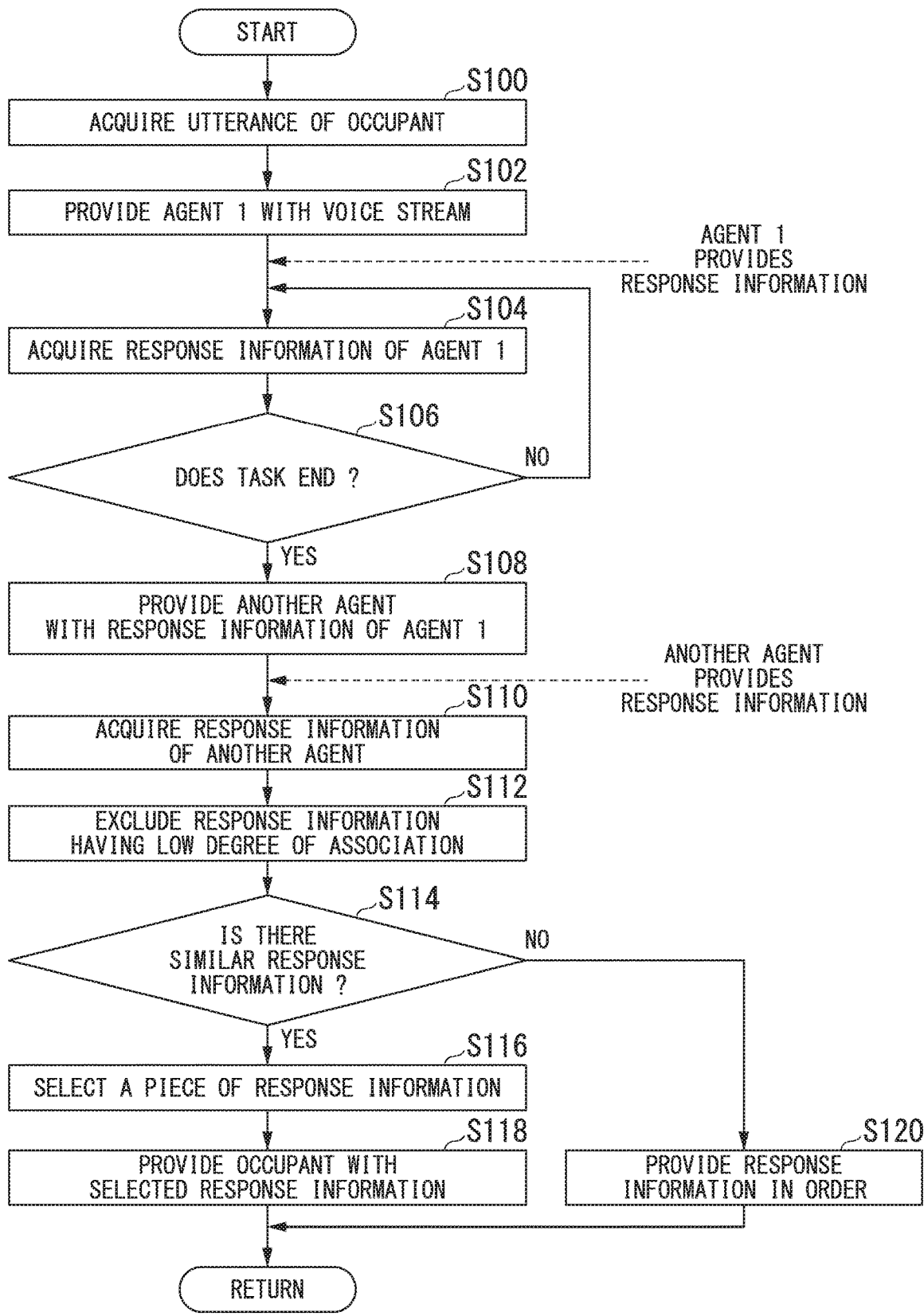
FIG. 11 is a flowchart showing an example of the flow of a process which is performed by the manager.

FIG. 11 is a flowchart showing an example of the flow of a process to be executed by the manager 110. For example, in this process, it is assumed that the agent 1 starts up.

First, the manager 110 acquires the utterance of the occupant (step S100). Next, the manager 110 provides the agent 1 with the voice stream (step S102). Accordingly, the agent 1 provides the manager 110 with the response information transmitted by the agent server 200-1. Next, the manager 110 acquires response information provided by the agent 1 (step S104).

Next, the manager 110 determines whether the task of the agent 1 ends (step S106). For example, when the response information to the utterance of occupant is provided, the manager 110 determines that the task ends. For example, when the response information provided by the agent 1 is associated with information indicating the end of the task, the manager 110 may determine that the task ends. If the task does not end, the process returns to step S104.

If it is determined that the task ends, the manager 110 provides another agent with information indicating the response information of the agent 1 (step S108). Here, the manager 110 starts another agent when the other agent does not start up. The other agent acquires response information according to the information provided by the manager 110 from the agent server 200, and provides the manager 110 with the acquired response information. Next, the manager 110 acquires response information provided by another agent (step S110).

Next, the manager 110 excludes response information in which a degree of association with the response information provided by the agent 1 is low, among the response information provided by another agent in step S110 (step S112). The manager 110 may exclude response information in which a degree of association with the utterance of occupant is low, among the response information provided by another agent in step S110, or may exclude response information in which a degree of association with the utterance of occupant is low, and a degree of association with the response information provided by the agent 1 is low.

Next, the manager 110 determines whether the response information provided by the agent 1 is similar to the response information provided by another agent (step S114). When it is determined that the response information is similar, the manager 110 selects one of the response information provided by another agent (step S116), and provides the occupant with the selected response information (step S118).

If the response information is not similar, the manager 110 sequentially provides the occupant with the response information provided by the agent 1 and another agent (step S120). At this time, the manager 110 may determine the order of the response information to be provided to the occupant, on the basis of the contents of the response information. For example, the manager 110 determines the order on the basis of a predetermined rule or algorithm. For example, the manager 110 analyzes the meaning of the response information, and determines the order of the response information so that the occupant can easily understand the meaning of the response information such that the analyzed meaning is deductive, logical, time-series, or the like.

For example, when the inquiry of the occupant is a route search to point A, and the response information is "it is possible to arrive by route B", "route C is less crowded than route B", and "it is possible to arrive by route C", the manager 110 provides the occupant with response information in order of "it is possible to arrive by route B", "it is possible to arrive by route C", and "route C is less crowded than route B". If the response information "route C is less crowed than route B" is provided before the response information "it is possible to arrive by route C", the occupant cannot understand what route C is for. Thus, the process of one routine of this flowchart ends.

According to the aforementioned first embodiment, the agent device 100 can improve the degree of satisfaction of the occupant, by providing the second agent controller 150 different from the first agent controller 150 with information on the service to be provided to the occupant.

Second Embodiment

Hereinafter, a second embodiment will be described. In the second embodiment, the manager 110 preferentially provides the utterance of the occupant and the response information provided by the agent to the agent that is good at providing the response information or the information on the utterance of the occupant. Hereinafter, differences from the first embodiment will be mainly explained.

Figure 12:
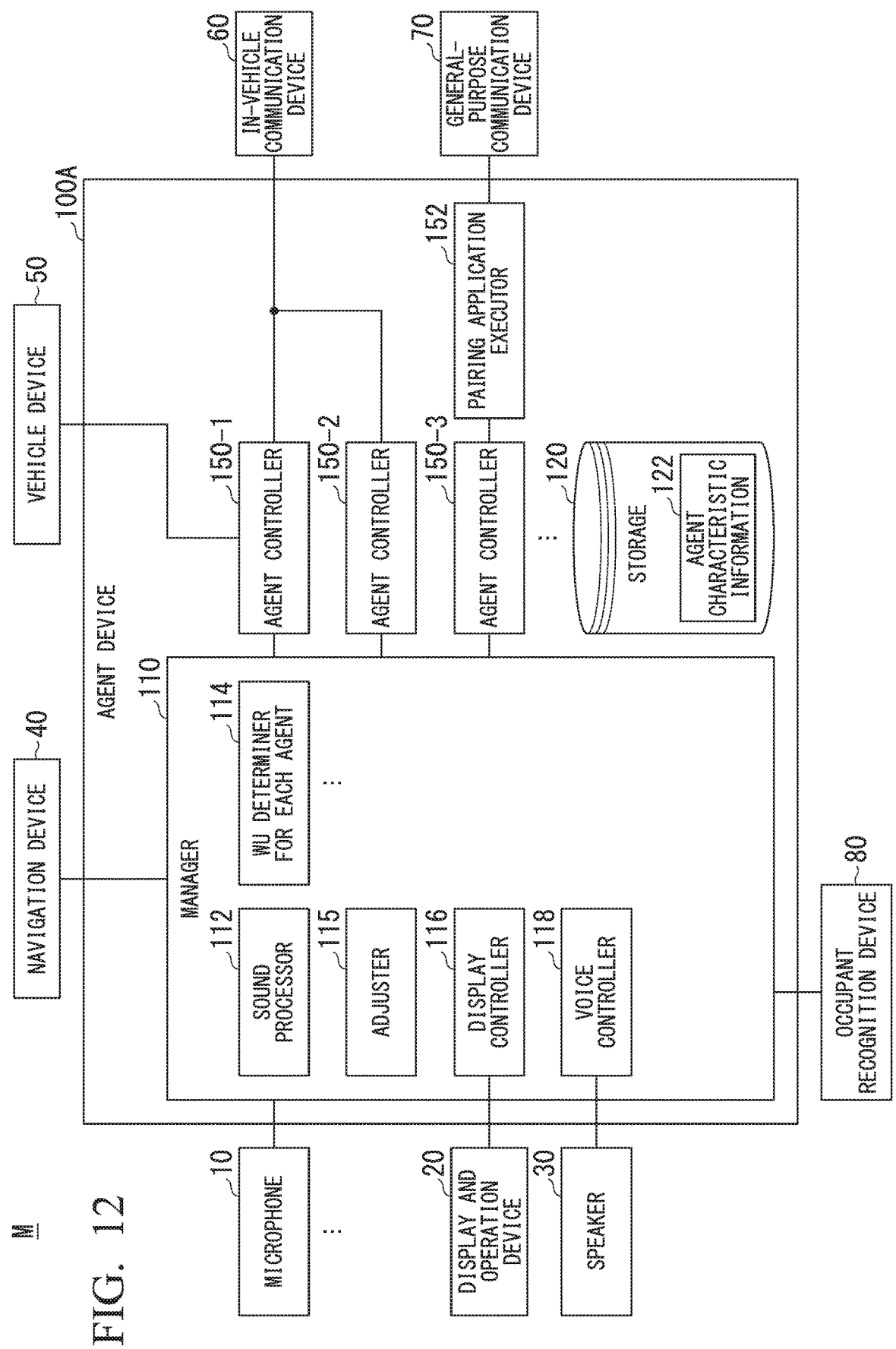
FIG. 12 is a diagram showing a configuration of an agent device according to a second embodiment and apparatuses mounted on a vehicle M.

FIG. 12 is a diagram showing a configuration of an agent device 100A according to the second embodiment and apparatuses mounted on a vehicle M. The agent device 100A is equipped with a storage 120, in addition to the functional configuration of the first embodiment. The storage 120 stores agent characteristic information 122.

FIG. 13 is a diagram showing an example of the contents of the agent characteristic information 122. The agent characteristic information 122 is, for example, information indicating a specialty field for each agent. The specialty field of the agent is a specialty field regarding the response, knowledge, and the like to be provided to the occupant by the agent. The fields are, for example, fields such as geography, music, current affairs, sports, and entertainment. For example, in the example of FIG. 13, the agent 1 is good at the geography field, but is not good at the current affairs field. That is, the agent 1 is good at searching for a route and providing information on facilities located at predetermined positions, but is not good at providing information on incidents or accidents.

The manager 110 preferentially acquires response information from an agent that is good at a field associated with the utterance of the occupant or the contents of the response information provided by the agent (details thereof will be described below). The term "preferentially" includes that the agent has a higher priority than the other agent, and that the other agent are not considered (does not request a response from the other agent controller 150).

Figure 14:
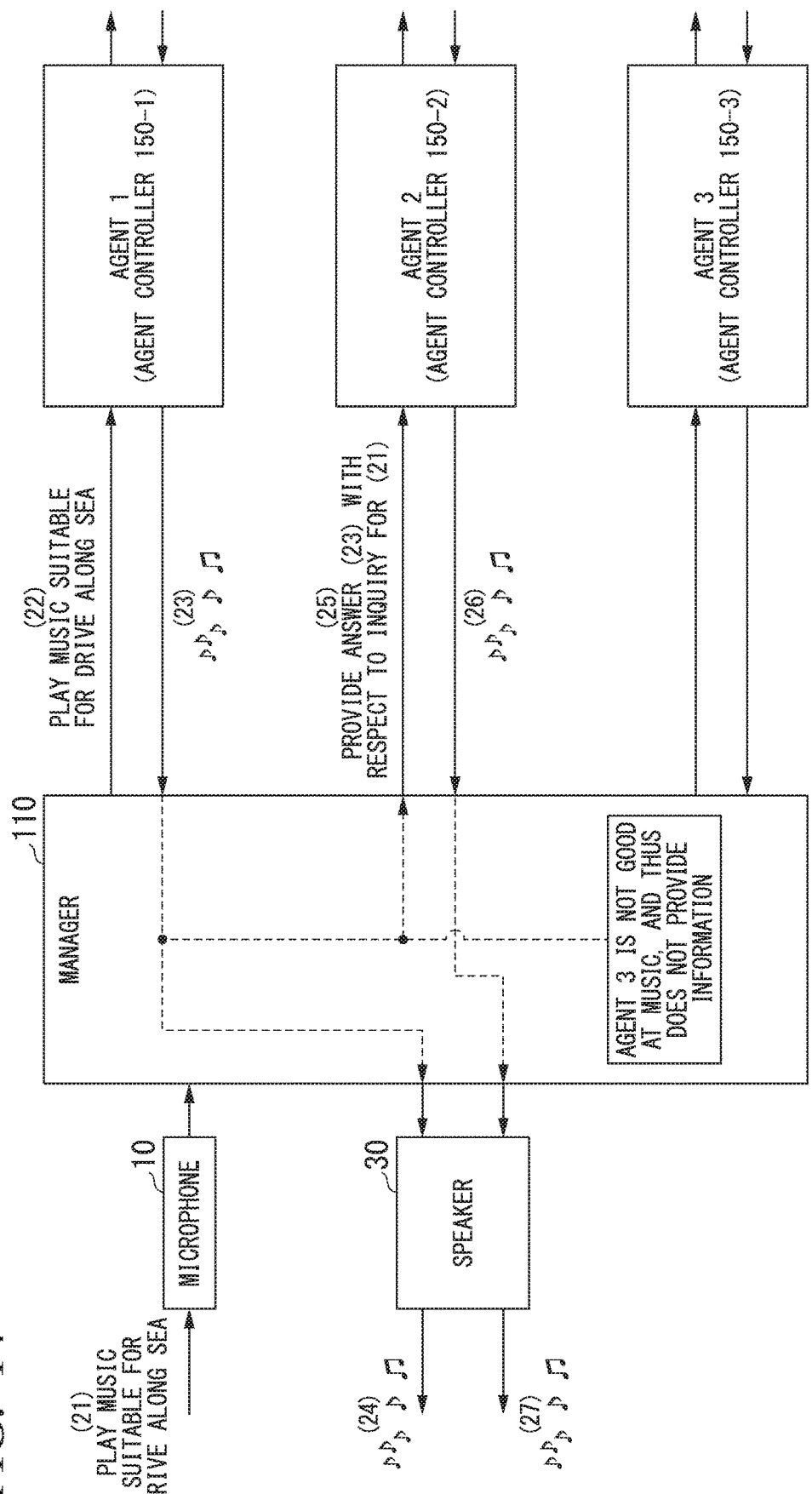
FIG. 14 is a diagram for explaining the contents of process which is performed by the manager according to the second embodiment.

FIG. 14 is a diagram for explaining the contents of the process performed by the manager 110 according to the second embodiment. (21) When the occupant inputs the wake-up word to the microphone 10 and starts the agent 1, and then inputs to the microphone 10 to "play music suitable for a drive along the sea", (22) the manager 110 transmits an voice stream associated with the input voice to the agent 1. (23) The agent 1 transmits the response information (music), which is acquired from the agent server 200, to the manager 110. (24) Therefore, the response information (music) is provided to the occupant.

(25) The manager 110 determines that the field associated with the utterance of occupant and the response information of the agent 1 is music. For example, the manager 110 determines the field, on the basis of the meaning of the information included in the utterance of occupant or response information. The manager 110 specifies the agent 2 that is good at music with reference to the agent characteristic information 122, and provides the specified agent 2 with the utterance of the occupant and the contents of the responded music. The manager 110 does not provide the agent 3 that is not good at music with the utterance of the occupant and the contents of the responded music.

(26) The agent 2 provides the manager 110 with response information to the information provided to the agent server 200 in the aforementioned (25). (27) The manager 110 provides the occupant with the contents of the response information provided in the aforementioned (26). The provision of the music of the aforementioned (27) is performed, for example, after the provision of the music of the aforementioned (24) is performed.

By the aforementioned process, the agent device 100 can specify the agent server 200 that provides more useful information, and can obtain useful information from the agent server 200. Further, the agent device 100 can provide the occupant with the information acquired from the agent server 200. As a result, the agent device 100 can provide the occupant with more useful information.

[Flowchart]

Figure 15:
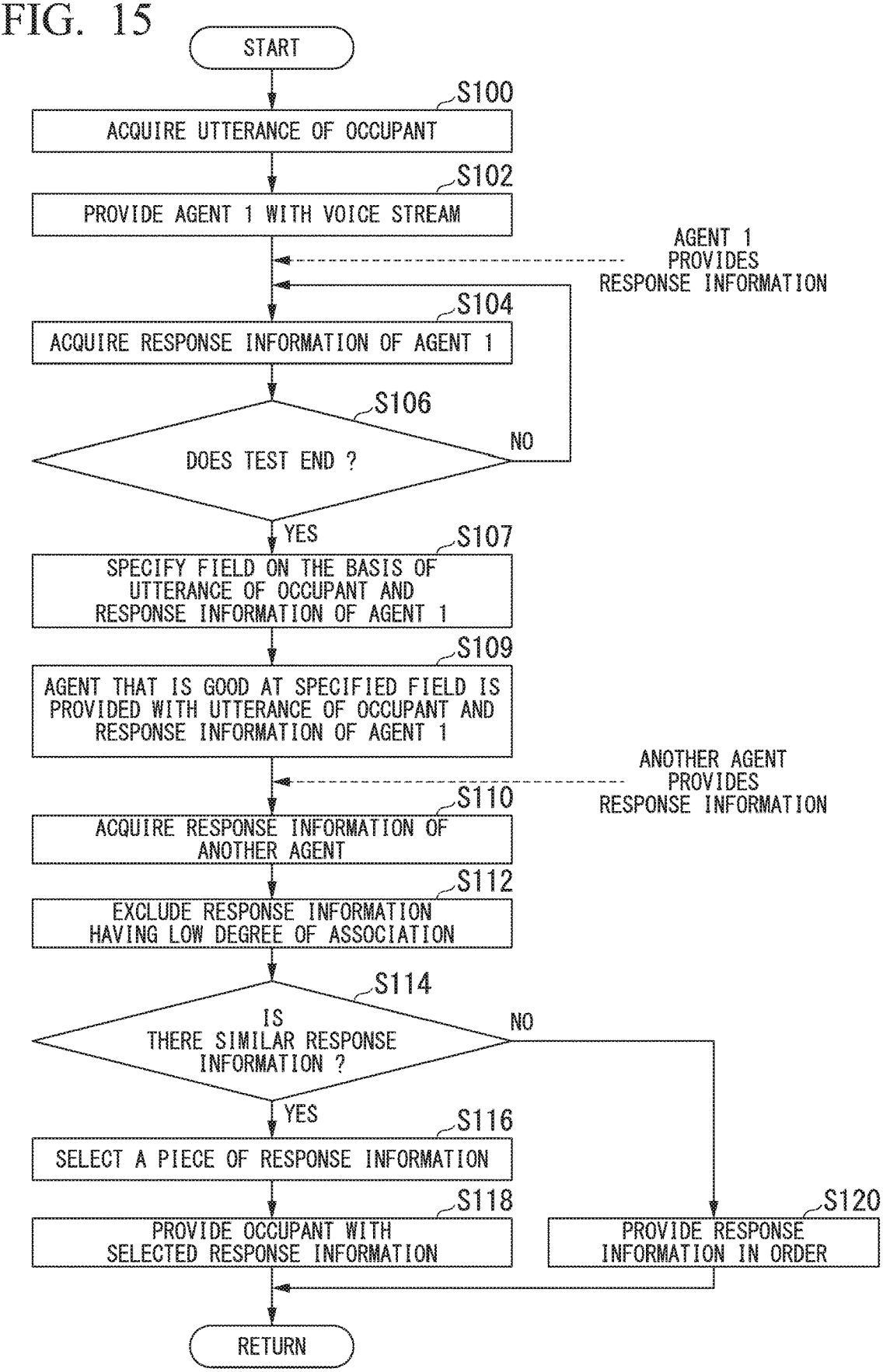
FIG. 15 is a flowchart showing an example of a flow of a process which is executed by the manager according to the second embodiment.

FIG. 15 is a flowchart showing an example of the flow of a process to be executed by the manager 110 of the second embodiment. Since the process of steps S100 to S104 and steps S110 to S120 in the flowchart of FIG. 15 are the same as the processes of the same step numbers of FIG. 11, the explanation thereof will not be provided.

When determining that the task ends in the process of step S106, the manager 110 specifies a field of information to be provided to the occupant on the basis of the utterance of the occupant and the response information of the agent 1 (step S107). Next, the manager 110 specifies an agent that is good at the field specified in step S107 with reference to the agent characteristic information 122, and provides the specified agent with the utterance of occupant and the response information of the agent 1 (step S109).

The agent provided with the information of step S109 transmits the information obtained in the processing of step S109 to the agent server 200, acquires the response information provided by the agent server 200, and provides the acquired information to the manager 110. Further, after acquiring the response information provided by the agent, the manager 110 performs various processes (steps S112, S114, etc.), and provides the occupant with the response information provided to the agent on the basis of the result of the process.

According to the aforementioned second embodiment, the agent device 100 can provide the occupant with more useful information.

Third Embodiment

Hereinafter, a third embodiment will be described. In the third embodiment, the adjuster 115 is omitted in the manager 110, and the adjuster is provided in the agent controller 150. Hereinafter, differences from the first embodiment and the second embodiment will be mainly explained.

Figure 16:
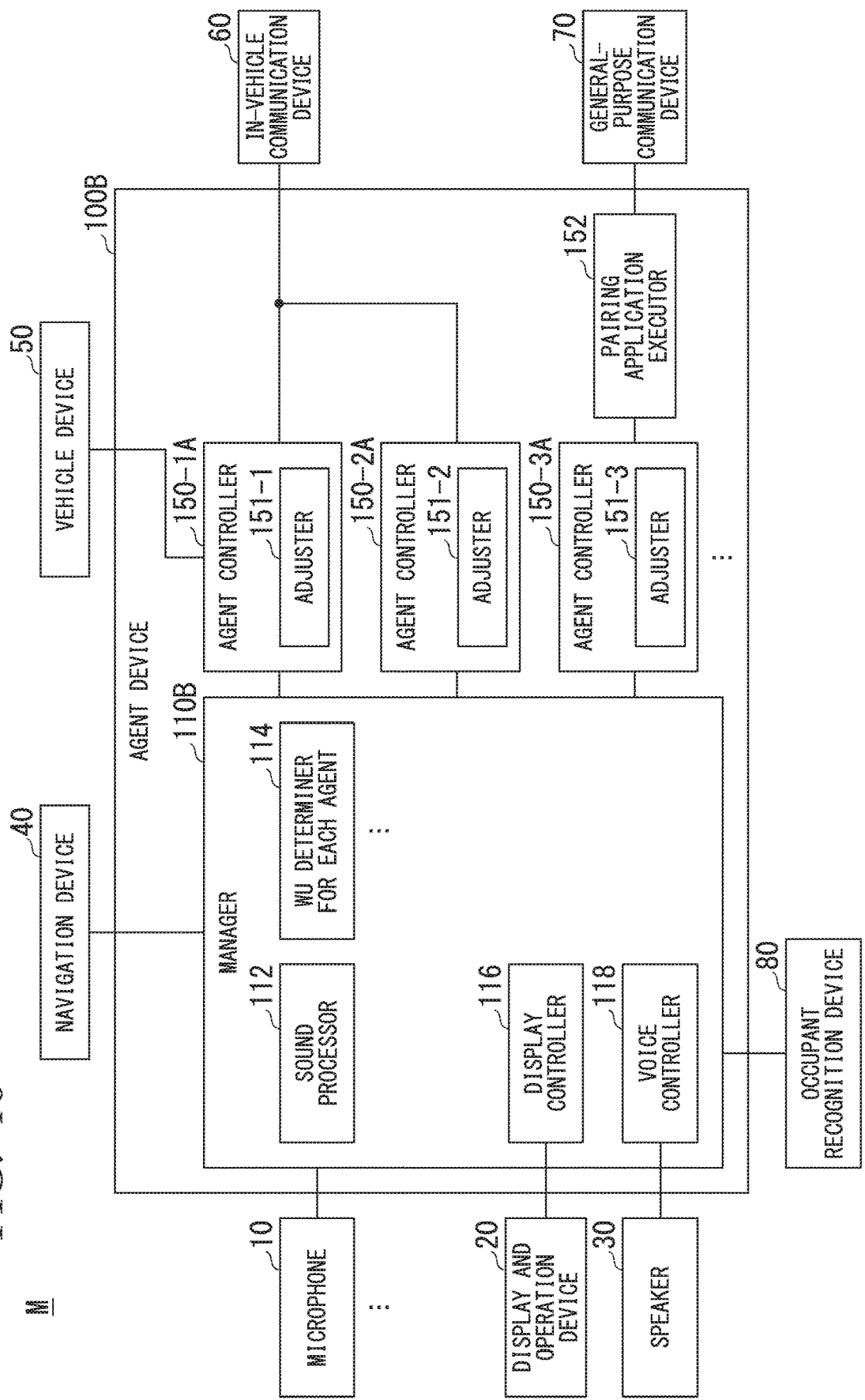
FIG. 16 is a diagram showing a configuration of an agent device according to a third embodiment and apparatuses mounted on the vehicle M.

FIG. 16 is a diagram showing a configuration of an agent device 100B according to the third embodiment and apparatuses mounted on the vehicle M. The agent device 100B is equipped with a manager 110B, instead of the manager 110. The manager 110B has a functional configuration in which the adjuster 115 is omitted in the functional configuration of the manager 110 of the first embodiment. The agent device B is equipped with agent controllers 150-1A, 150-2A, and 150-3A, instead of the agent controllers 150-1, 150-2, and 150-3.

The agent controllers 150-1A, 150-2A, and 150-3A are equipped with adjusters 151-1, 151-2, and 151-3, respectively. Hereinafter, when the adjusters 151-1, 151-2, and 151-3 are not distinguished, they may be simply referred to as the "adjuster 151". Some of the adjusters 151-1 to 151-3 may be omitted.

Figure 17:
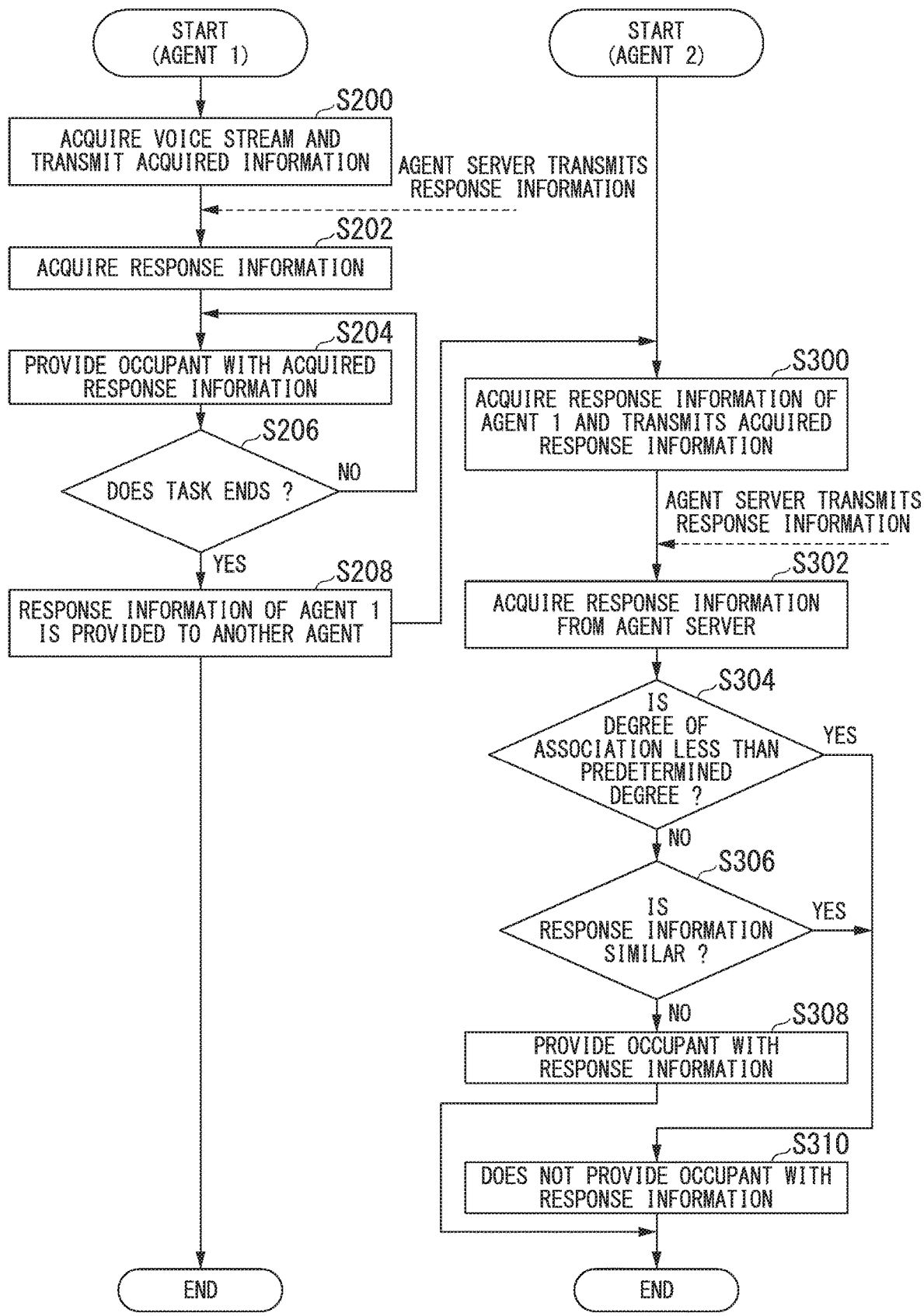
FIG. 17 is a flowchart showing an example of the flow of a process which is executed by the agent device according to the third embodiment.

FIG. 17 is a flowchart showing an example of the flow of a process to be executed by the agent device 100B of the third embodiment. In this process, it is assumed that the agent 1 starts. First, the agent 1 acquires a voice stream based on the voice which is input by the occupant, and transmits the acquired voice stream to the agent server 200-1 (S200). Next, the agent 1 acquires the response information provided by the agent server 200-1 (step S202), and provides the occupant with the acquired response information (step S204).

Next, the agent 1 determines whether the task ends (step S206). If the task does not end, the process returns to step S202. If the task ends, the agent 1 provides another agent with its own response information (step S208). For example, the agent 1 provides the agents 2 and 3 with its own response information. In the explanation of the flowchart, since the agent 3 performs the same process as that of the agent 2 to be described below, the explanation of the agent 3 will not be provided.

The agent 2 acquires the response information provided by the agent 1, and transmits the acquired response information to the agent server 200-2 (step S300). Next, the agent 2 acquires the response information provided by the agent server 200-2 (step S302).

Next, the agent 2 determines whether the degree of association between the response information provided by the agent server 200-2 and the information provided by the agent 1 is less than a predetermined degree (step S304). If the degree of association is less than the predetermined degree, the process proceeds to step S310.

If the degree of association is not less than the predetermined degree (if it is equal to or higher than the predetermined degree), the agent 2 determines whether the similarity between the response information provided by the agent 1 and the response information provided by the agent server 200-2 is equal to or higher than the predetermined degree (step S306). If the similarity is not equal to or greater than the predetermined degree, the agent 2 provides the occupant with the response information provided by the agent server 200-2 (step S308).

If the similarity is equal to or greater than the predetermined degree, the agent 2 does not provide the occupant with the response information provided by the agent server 200-2 (step S310). Thus, the process of one routine of this flowchart ends.

By the above-described processes, since the agent controller 150 performs the same processes as those of the adjuster 115 of the first embodiment, the processing load of the manager 110 is reduced. As a result, analysis of the contents of the utterance input to the microphone 10, the process on the display and operation device 20, the process on the speaker 30, and the like are performed quickly. As a result, the degree of satisfaction of occupant is improved. The agent controller 150 may include the agent characteristic information 122. In this case, the agent controller 150 determines an agent that provides response information with reference to the agent characteristic information 122.

According to the aforementioned third embodiment, the same effects as those of the first embodiment can be obtained.

As described above, although the embodiments for carrying out the present invention have been described using the embodiments, the present invention is not limited to these embodiments at all, and various modifications and substitutions can be added without departing from the gist of the present invention.

What is claimed is:

1. An agent device comprising:
a plurality of agent controllers configured to provide a service including causing an output device to output a response of voice, in accordance with an utterance of an occupant of a vehicle,
wherein a first agent controller included in the plurality of agent controllers provides an agent controller different from the first agent controller with first service information on the service to be provided to the occupant,
wherein a second agent controller included in the plurality of agent controllers provides the occupant with second service information in which a degree of association with the first service information is equal to or greater than a predetermined degree, in accordance with the first service information provided by the first agent controller, and
the second agent controller does not provide the occupant with third service information in which the degree of association with the first service information is less than the predetermined degree, in accordance with the first service information provided by the first agent controller.

2. The agent device according to claim 1, wherein the second agent controller voluntarily provides the occupant with the second service information, without depending on an instruction of the occupant.

3. The agent device according to claim 1, wherein the first service information is a search result on a search of a destination performed by the occupant of the vehicle.

4. The agent device according to claim 1, wherein the second service information is one or more information of a recommended place, music, a route to the destination or knowledge information on the destination.

5. The agent device according to claim 1, wherein the first agent controller included in the plurality of agent controllers preferentially provides first service information on the service to be provided to the occupant, to an agent controller which is good at providing information on the first service information, among one or more agent controllers different from the first agent controller.

6. The agent device according to claim 1, further comprising:
an adjuster configured to provide an agent controller different from the first agent controller with information on a first service related to a service to be provided to the occupant by the first agent controller.

7. An agent device comprising:
a plurality of agent controllers configured to provide a service including causing an output device to output a response of voice, in accordance with an utterance of an occupant of a vehicle,
wherein a first agent controller included in the plurality of agent controllers provides an agent controller different from the first agent controller with first service information on the service to be provided to the occupant,
wherein a second agent controller included in the plurality of agent controllers is able to provide the occupant with second service information on the first service information, in accordance with the first service information provided by the first agent controller,
wherein a third agent controller included in the plurality of agent controllers is able to provide the occupant with fourth service information on the first service information, in accordance with the first service information provided by the first agent controller, and
when a similarity between the fourth service information and the second service information is equal to or greater than a predetermined degree, the third agent controller does not provide the occupant with the fourth service information.

8. The agent device according to claim 7, wherein when the similarity between the fourth service information and the second service information is less than the predetermined degree, the third agent controller provides the occupant with the fourth service information.

9. The agent device according to claim 7, wherein the second agent controller voluntarily provides the occupant with the second service information, without depending on an instruction of the occupant.

10. The agent device according to claim 7, wherein the first service information is a search result on a search of a destination performed by the occupant of the vehicle.

11. The agent device according to claim 7, wherein the second service information is one or more information of a recommended place, music, a route to the destination or knowledge information on the destination.

12. The agent device according to claim 7, wherein the first agent controller included in the plurality of agent controllers preferentially provides first service information on the service to be provided to the occupant, to an agent controller which is good at providing information on the first service information, among one or more agent controllers different from the first agent controller.

13. An agent device comprising: according to claim 6,
a plurality of agent controllers configured to provide a service including causing an output device to output a response of voice, in accordance with an utterance of an occupant of a vehicle, wherein a first agent controller included in the plurality of agent controllers provides an agent controller different from the first agent controller with first service information on the service to be provided to the occupant, and
an adjuster configured to provide an agent controller different from the first agent controller with information on a first service related to a service to be provided to the occupant by the first agent controller,
wherein the adjuster provides two or more agent controllers different from the first agent controller with information on the first service, and when each of the two or more agent controllers proposes to provide the occupant with second service information on the first service information in accordance with first service information, the adjuster provides the occupant with at least one of a plurality of pieces of second service information.

14. The agent device according to claim 13, wherein the first service information is a search result on a search of a destination performed by the occupant of the vehicle.

15. The agent device according to claim 13, wherein the second service information is one or more information of a recommended place, music, a route to the destination or knowledge information on the destination.

* * * * *